Aug. 8, 1939.  G. F. DALY ET AL  2,168,763
RECORD CONTROLLED MACHINE WITH IMPROVED SERIAL NUMBER CONTROLS
Original Filed March 23, 1933    12 Sheets-Sheet 1

Aug. 8, 1939.  G. F. DALY ET AL  2,168,763
RECORD CONTROLLED MACHINE WITH IMPROVED SERIAL NUMBER CONTROLS
Original Filed March 23, 1933    12 Sheets-Sheet 5

Inventors
George F. Daly
Arthur H. Dickinson

Cooper, Kerr & Dunham
Attorneys

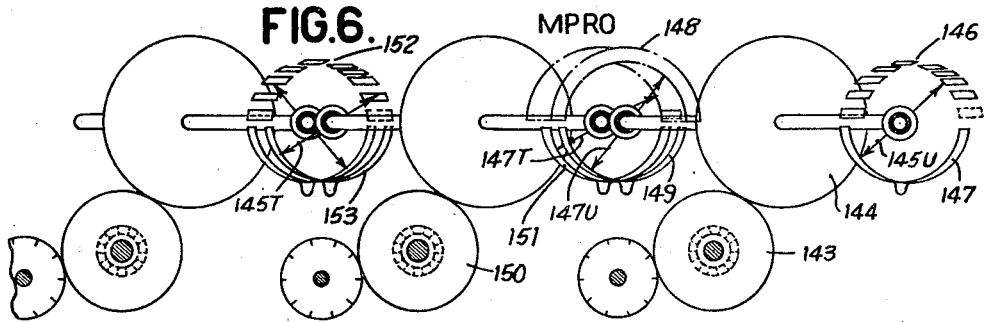
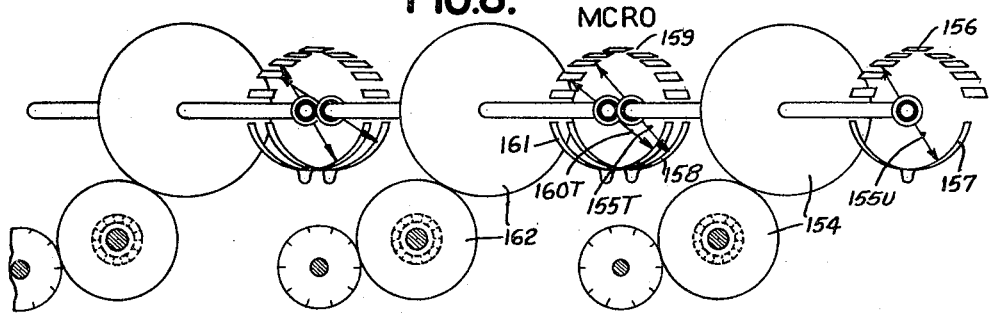
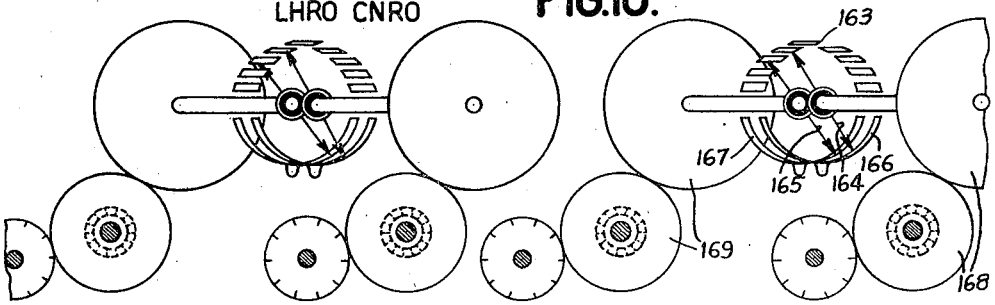
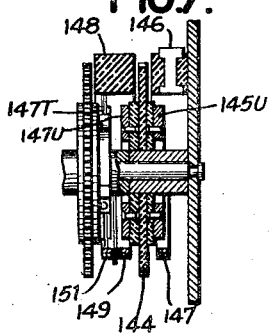
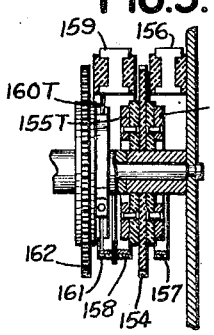
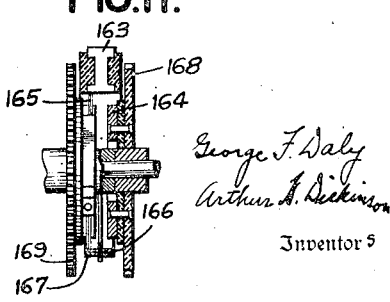

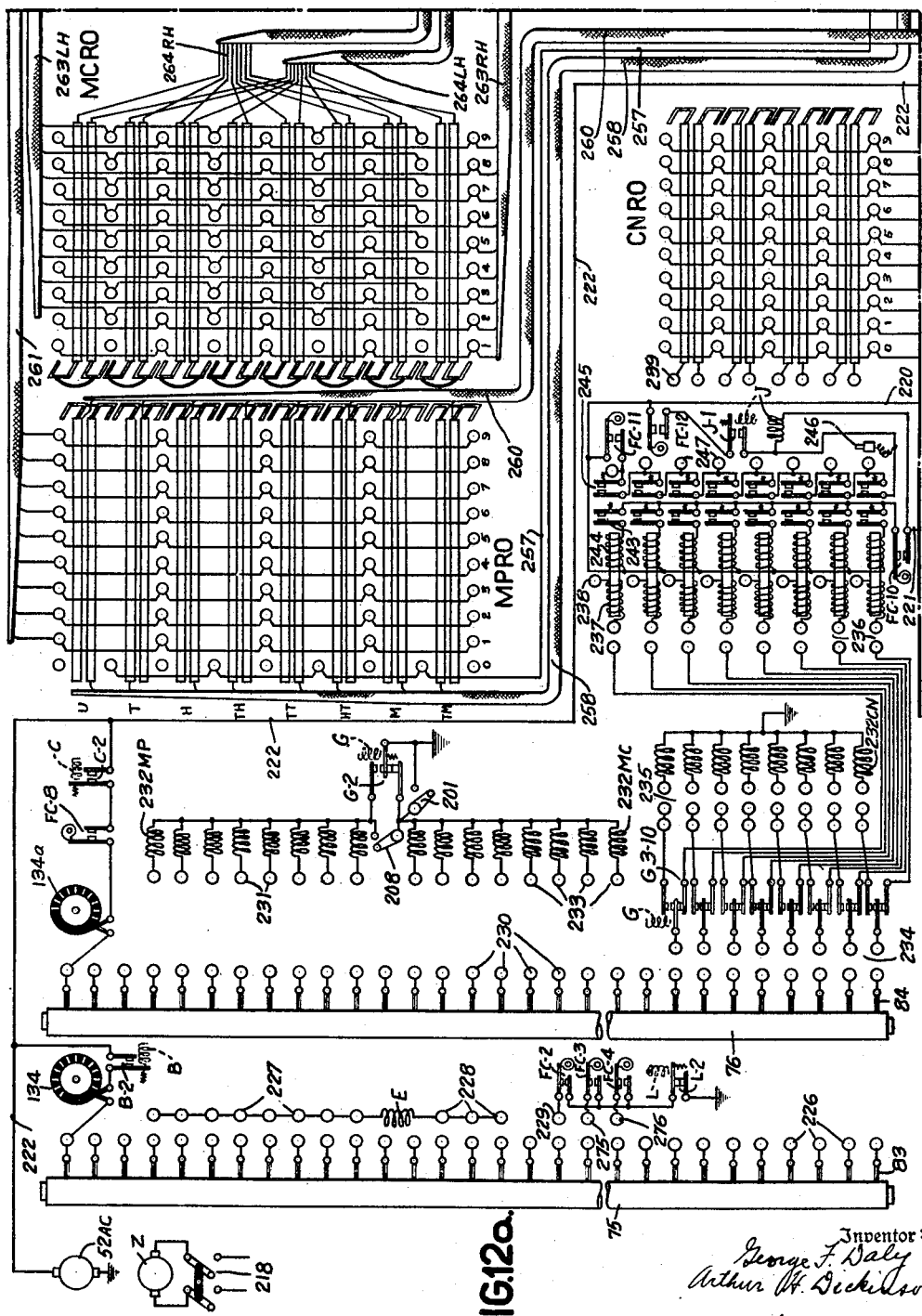

Aug. 8, 1939.  G. F. DALY ET AL  2,168,763
RECORD CONTROLLED MACHINE WITH IMPROVED SERIAL NUMBER CONTROLS
Original Filed March 23, 1933  12 Sheets—Sheet 8

George F. Daly
Arthur H. Dickinson
INVENTORS

BY
Cooper, Kerr & Dunham
ATTORNEYS

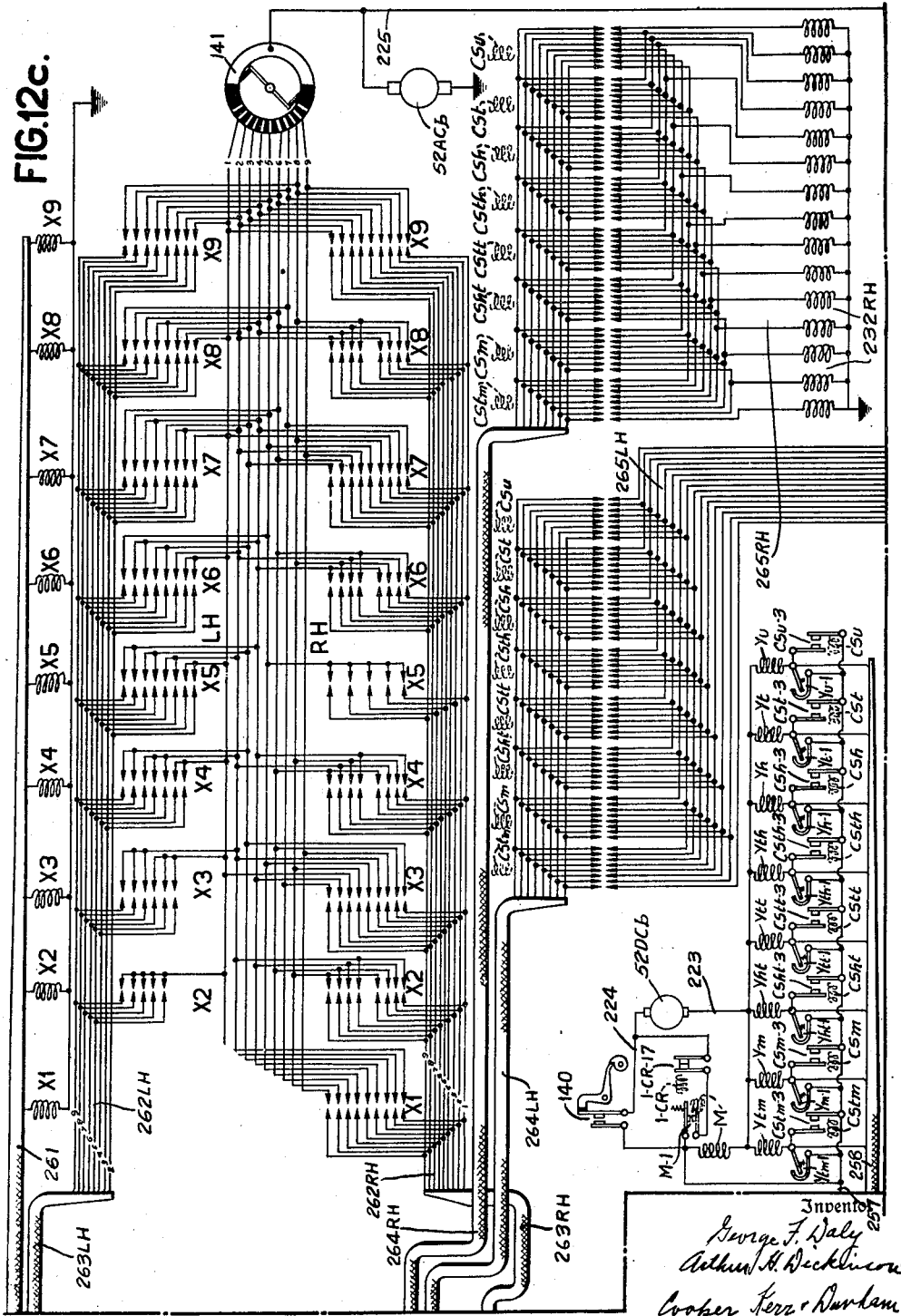

Aug. 8, 1939.  G. F. DALY ET AL  2,168,763
RECORD CONTROLLED MACHINE WITH IMPROVED SERIAL NUMBER CONTROLS
Original Filed March 23, 1933   12 Sheets-Sheet 10
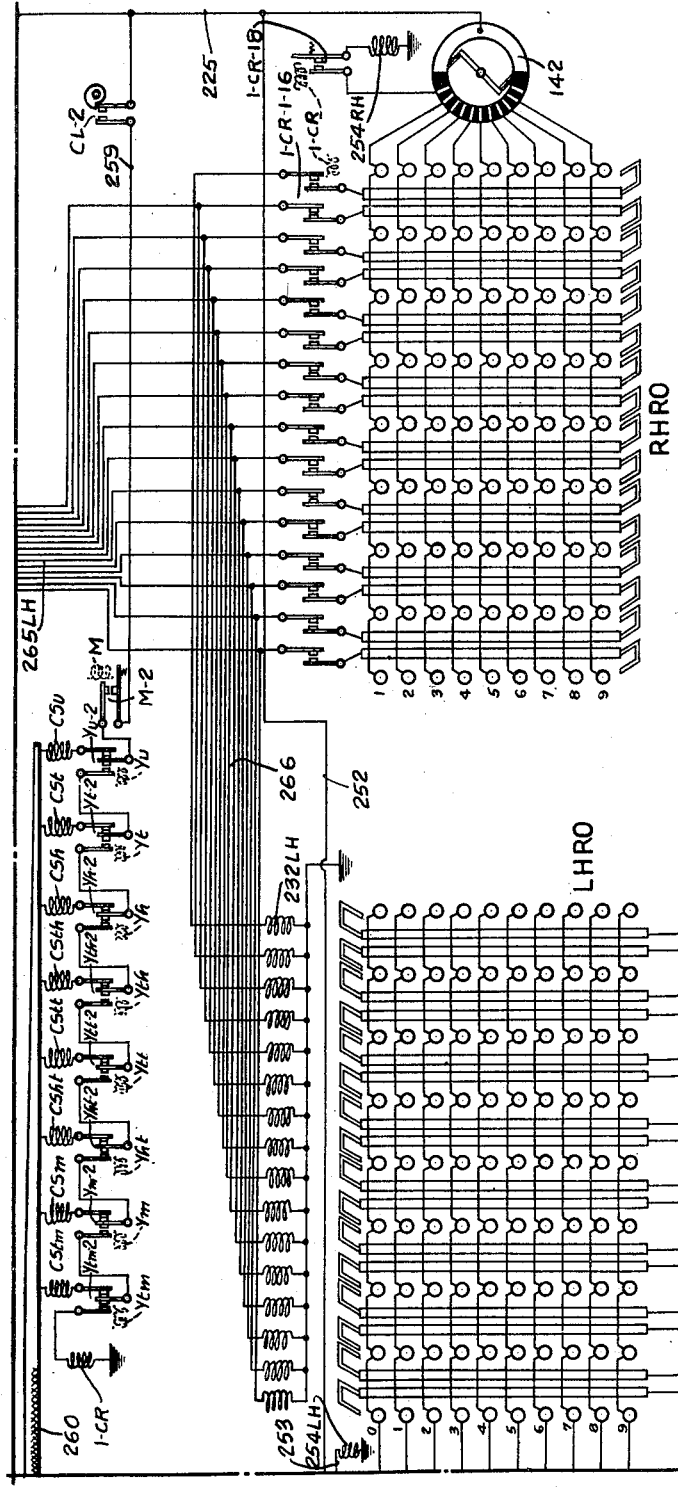
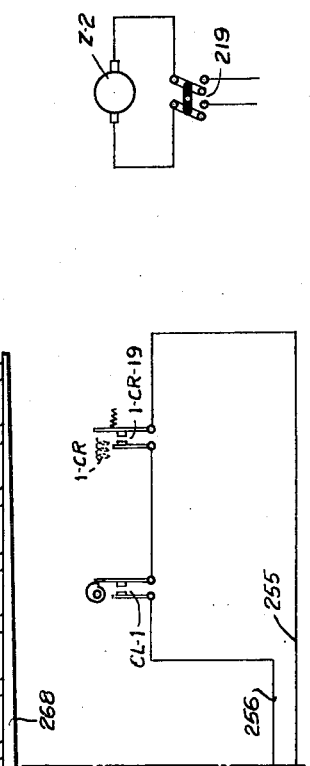
FIG.12d.
INVENTORS
George F. Daly
Arthur H. Dickinson
BY
Cooper, Kerr & Dunham
ATTORNEYS Aug. 8, 1939. G. F. DALY ET AL 2,168,763
RECORD CONTROLLED MACHINE WITH IMPROVED SERIAL NUMBER CONTROLS
Original Filed March 23, 1933 12 Sheets-Sheet 11

Inventors
George F. Daly
Arthur H. Dickinson
Cooper, Kerr & Dunham
Attorneys

Patented Aug. 8, 1939

2,168,763

UNITED STATES PATENT OFFICE 2,168,763

RECORD CONTROLLED MACHINE WITH IMPROVED SERIAL NUMBER CONTROLS

George F. Daly, Binghamton, and Arthur H. Dickinson, Bronxville, N. Y., assignors, by mesne assignments, to International Business Machines Corporation, New York, N. Y., a corporation of New York Original application March 23, 1933, Serial No. 662,250. Divided and this application December 31, 1937, Serial No. 182,868

12 Claims. (Cl. 101—19)

This invention relates to record controlled accounting machines and more particularly to serial number controls for such machines for controlling serial numbering operations upon records which pass in a run through the machine.

In certain forms of record controlled machines, serial numbering means such as counting means, printing means and/or serial number punching means are desirable for effecting serial numbering operations upon records. With such machines, certain records in a run may have distinctive characteristics signifying that they are leading records of a group, or other distinguishing characteristics may signify that a particular record in a run is misplaced or of some form which makes such records unsuitable for serial numbering operations. Furthermore, in machines of the above class, provision may be made for rejecting any desired records out of a run of other records and in such event provision must be made so as not to count or serially number such rejected records, otherwise serial numbers on following records in the run would be incorrect.

Accordingly, one object of the present invention resides in the provision of a machine provided with devices for the automatic elimination of improperly placed or marked records which are present in a run of records and for suppressing serial numbering and/or serial punching and/or serial counting of rejected records.

Another object of the present invention resides in the provision of an improved record controlled accounting machine with improved serial numbering means and improved means for suppressing or permitting operations of the serial numbering means.

A further object of the present invention resides in a record controlled machine with means whereby such operations as serial number printing, serial number counting and serial number punching can be suppressed for leading records of a run and such operations or desired ones of such operations effected for following detail cards of a run, all automatically by the operation of the machine.

A further object of the present invention resides in the provision of a machine wherein suppression of serial numbering operations such as printing, counting and punching will be automatically permitted on leading and following records but automatically suppressed for automatically detected misplaced records of a run.

A further object of the present invention resides in the provision of automatic suppression controls for serial numbering punching and counting means whereby operations will be automatically suppressed for both leading and misplaced cards in a run.

Further and other objects of the present invention relate to various improvements in controls for serial numbering means enabling changes to be made in the controls for one type of operation involved in one run of records or other operations involved in different runs of records and in further providing novel control means for detecting characteristics upon the records themselves which control means are effective on different types of runs to suppress or permit serial numbering operations.

A further object of the present invention resides in the provision of selective controls for a record controlled multiplying accounting machine and for a record controlled machine provided with reject means so that various card forms and various arrangements of cards may be selectively operated through a machine at the will of the operator.

Further and other objects of the present invention will be hereinafter set forth in the accompanying specification and claims and shown in the drawings which show by way of illustration a preferred embodiment and the principle thereof and what we now consider to be the best mode in which we have contemplated of applying that principle. Other embodiments of the invention employing the same or equivalent principle may be used and structural changes made as desired by those skilled in the art without departing from the present invention and within the spirit of the appended claims.

In the drawings:

Figures 1 and 1a together show somewhat diagrammatically the various units of the two interrelated machines. In these figures the units on the upper part of the two sheets comprise the card handling and entry receiving units and the units shown on the lower part of the two sheets and which are physically separate and separately driven from the units on the upper parts of the sheets comprise the accounting unit or computing section of the machine:

Fig. 2 is a detail sectional view of the card handling, serial numbering and punching section of the machine, the view is substantially a section taken on line 2—2 of Fig. 1a;

Fig. 3a is a detail view taken on line 3a—3a of Fig. 3;

Fig. 6 is a somewhat diagrammatic view of the readout device associated with the MP entry receiving device of the machine;

Fig. 7 is a fragmentary sectional view of such readout showing the construction;

Fig. 8 is a diagrammatic view of the multiplicand entry receiving device readout generally designated MCRO and Fig. 9 is a fragmentary detail sectional view showing the construction of the parts of this readout;

Fig. 10 is a diagrammatic view showing the type of readout device which is used for reading out amounts from the RH accumulator, the LH accumulator and serial number counter, SRRO denoting the readout for the serial number counter in the card handling section of the machine and CNRO designating the readout for the control number receiving device CN;

Fig. 11 is a fragmentary detail sectional view of the readout shown in Fig. 10;

Figure 12B:
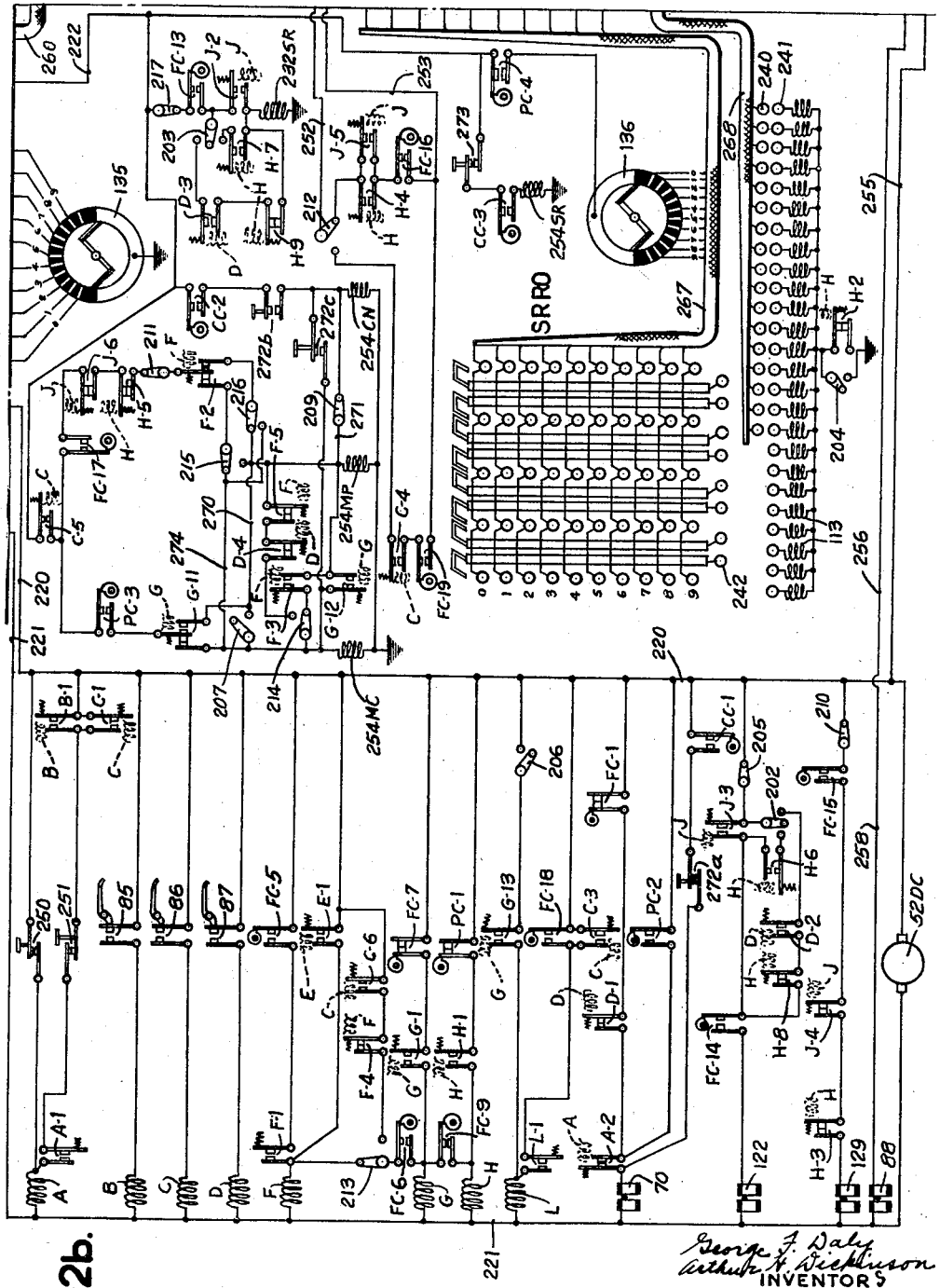
Figure 13:
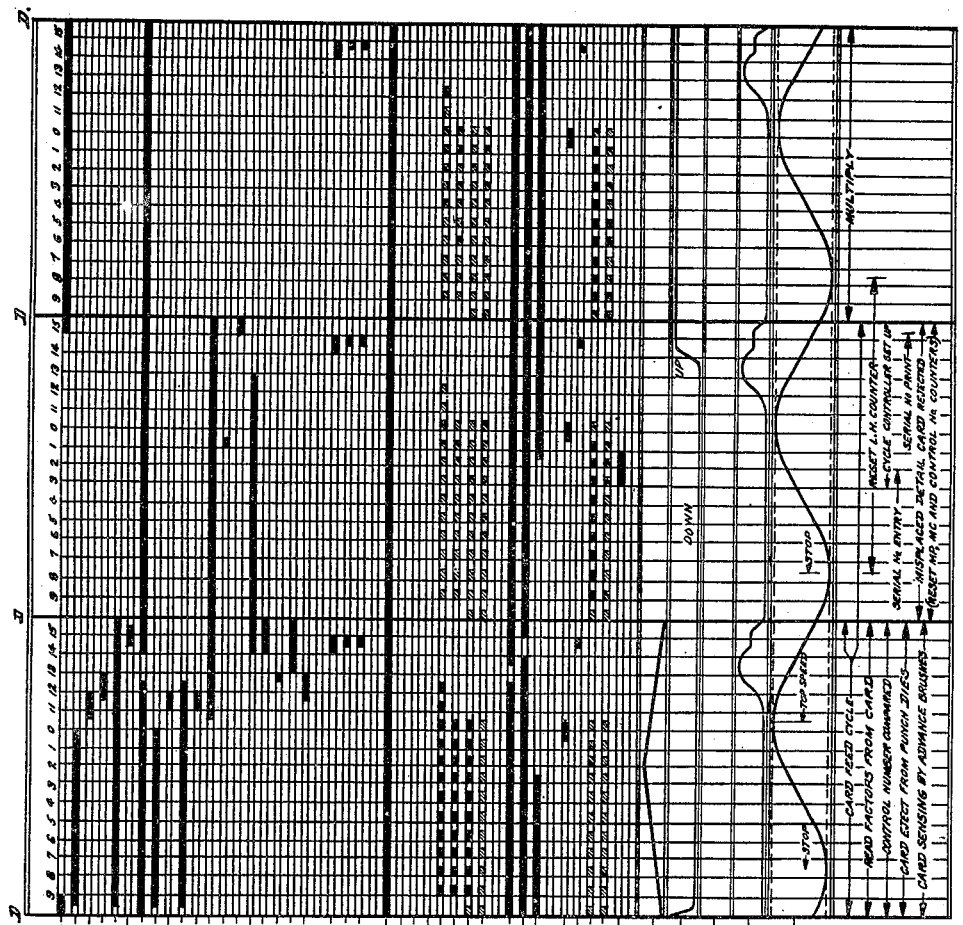
Figure 13A:
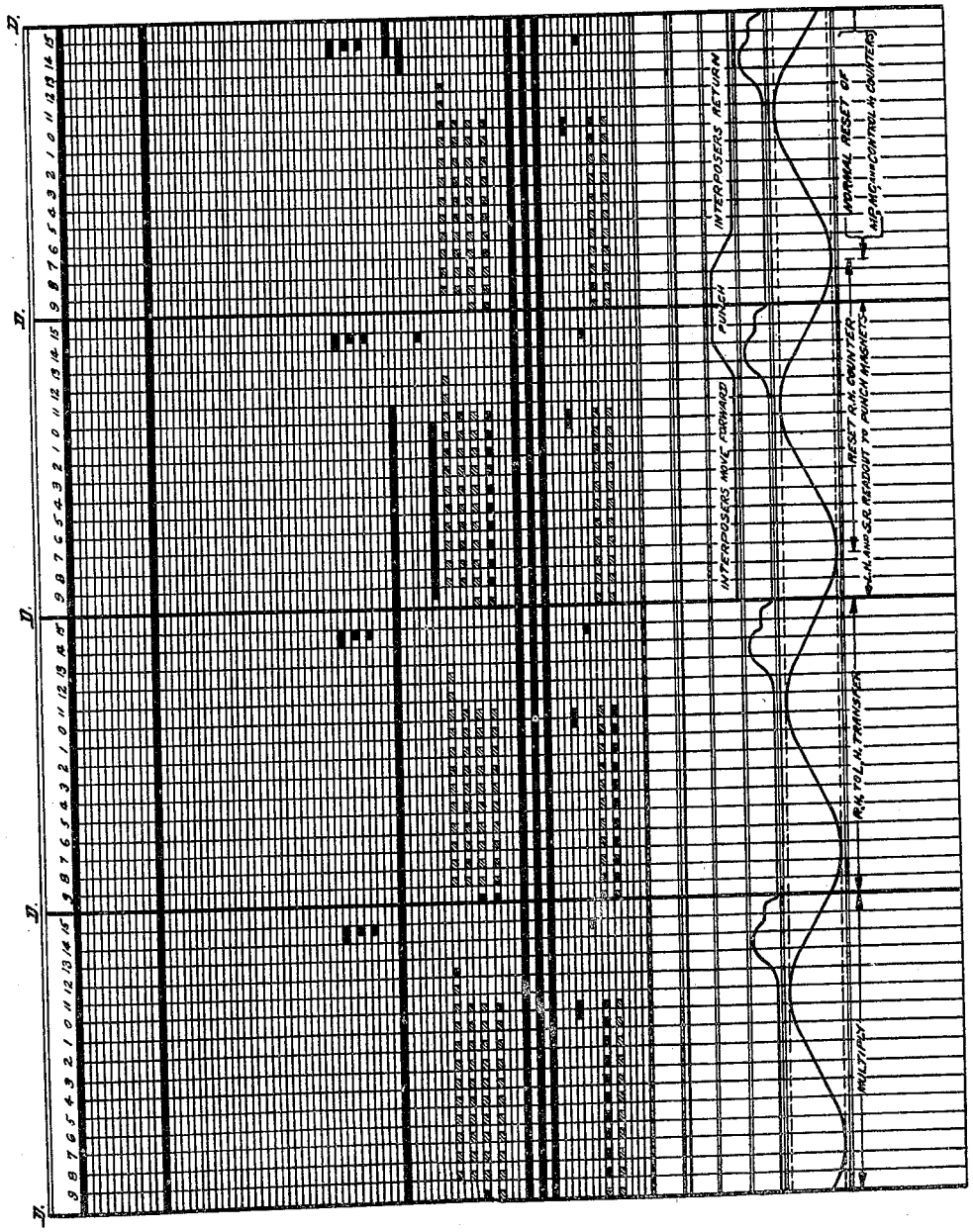

Figs. 12a, 12b, 12c, 12d, taken together, show the complete circuit diagram of both units of the machine and the inter-controls between the machines. In the arrangement of these figures as a composite diagram, Fig. 12a is to be placed at the top left and underneath Fig. 12a is to be placed Fig. 12b. These two figures taken together show the wiring in the card handling and punching section of the machine. To the right of Fig. 12a and in horizontal alignment therewith is to be placed Fig. 12c, below Fig. 12c is to be placed Fig. 12d in horizontal alignment with Fig. 12b. Figs. 12c and 12d show the wiring in the computing or calculating section;

Figs. 13 and 13a, taken together with Fig. 13a to the right of Fig. 13, show the timing diagram of the machine.

The present application constitutes a division of our copending application Serial No. 662,250, filed March 23, 1933, Patent No. 2,120,233, dated June 14, 1938, for Control means for record controlled accounting machines.

While the present application is particularly directed to serial numbering controls, such controls are interrelated with the controls for the accounting machine proper and such accounting machine will therefore be herein fully described and explained.

Before describing the details of the various parts of both units of the machine, a general description will be given of the various units and their locations in the card handling, punching and entry receiving section and in the calculating section. The card handling, punching and entry receiving section embodies a card feed, card handling and punching section and a card reject section, which are shown in the upper right hand corner of Fig. 1a, and also shown in transverse cross-section in Fig. 2 and in side elevation in Fig. 3. This part of the machine is arranged to feed cards and derive readings therefrom and afterwards pass the cards into a punching mechanism where certain of the cards may be punched. The punching mechanism is a punching mechanism of the gang punch type wherein there is a preliminary selection of punches for punching and a subsequent displacement of the selected punches through the card. The card handling section of the machine also includes a number of accumulators or receiving devices enumerated as follows. There is a receiving device designated MP for receiving the amount of the multiplier, a receiving device designated MC for receiving the amount of the multiplicand and a serial number counter designated SR and a receiving device for receiving control number designated CN. These are shown on Fig. 1.

Figure 1:
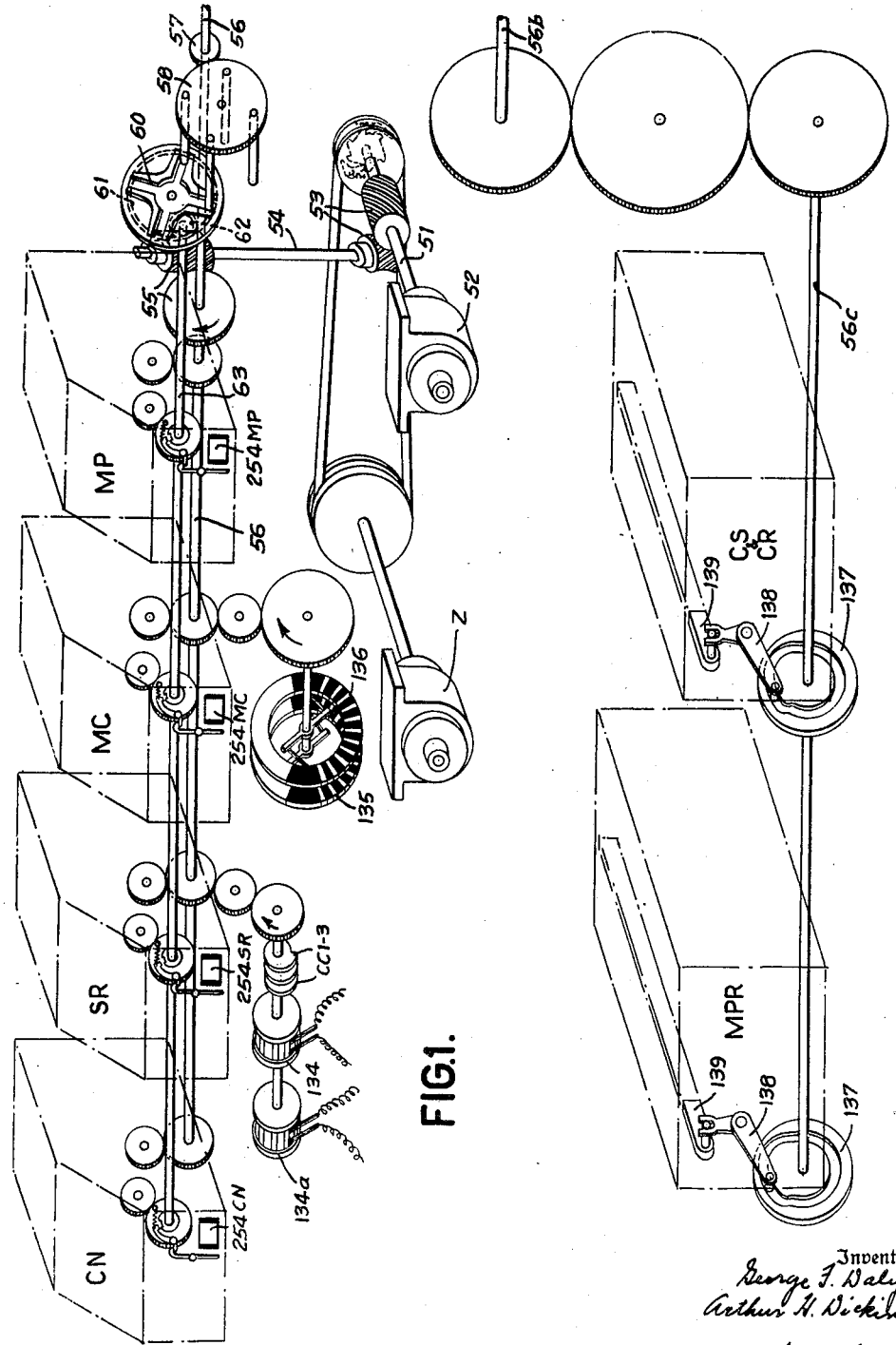

The calculating unit or section of the machine which is shown diagrammatically on the bottom of Figs. 1 and 1a, comprises the usual accumulator for accumulating right hand components of partial products, which is designated RH and an LH accumulator for left hand components of partial products designated LH. These accumulators are shown on Fig. 1a. The calculating section of the machine also includes a multiplying relay unit generally designated MPR (Fig. 1) and in this calculating section there is also provided a column shift unit generally designated CS. Certain additional electro-mechanical multi-contact relays generally designated CR are also located in the CS section of the machine.

The card handling unit includes a number of cam contact devices and an emitter device which will be subsequently described.

In the calculating unit there are also cam contact devices and emitter devices which will also be subsequently described.

*Machine drive*

Figure 2:
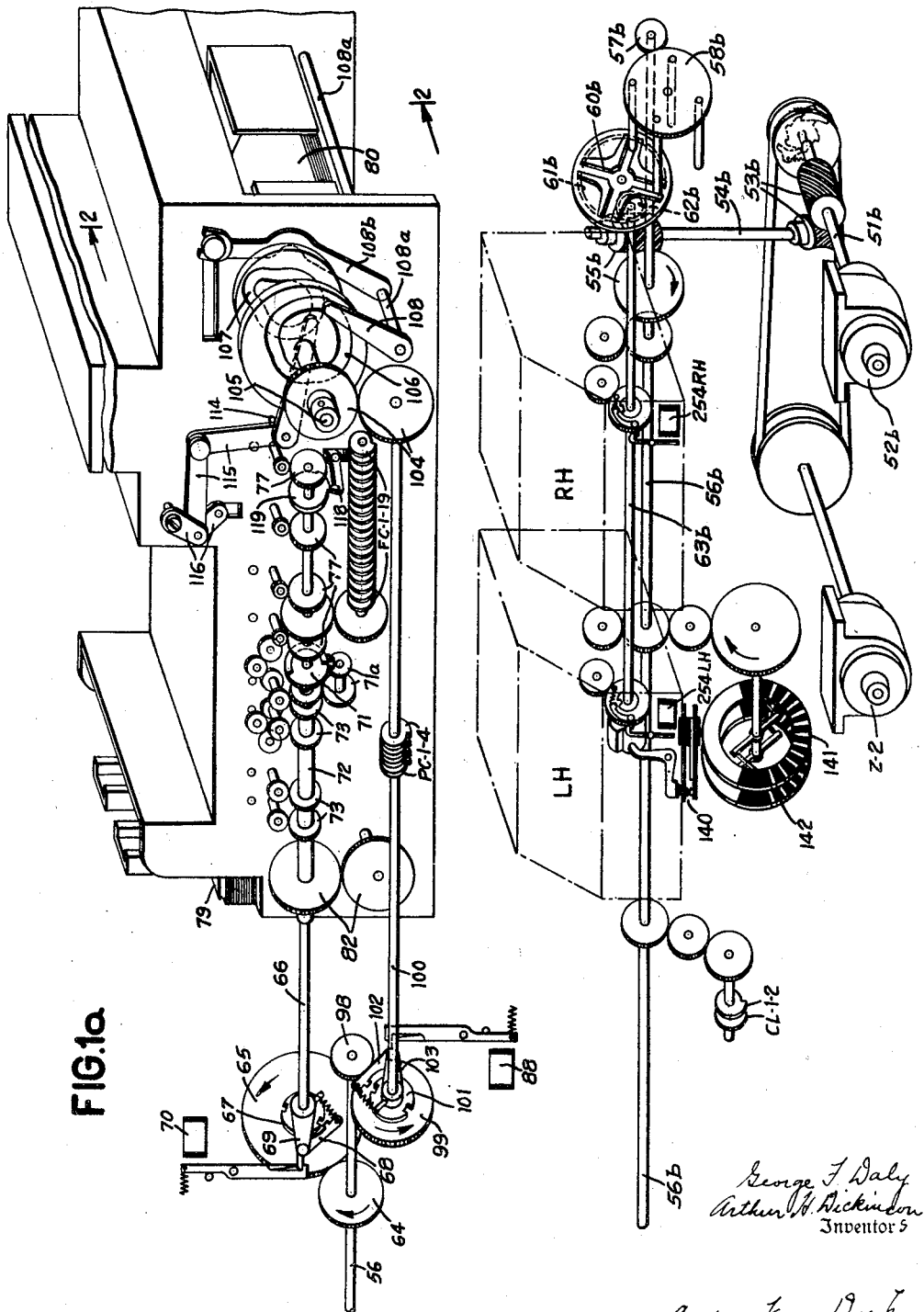
Figure 3:
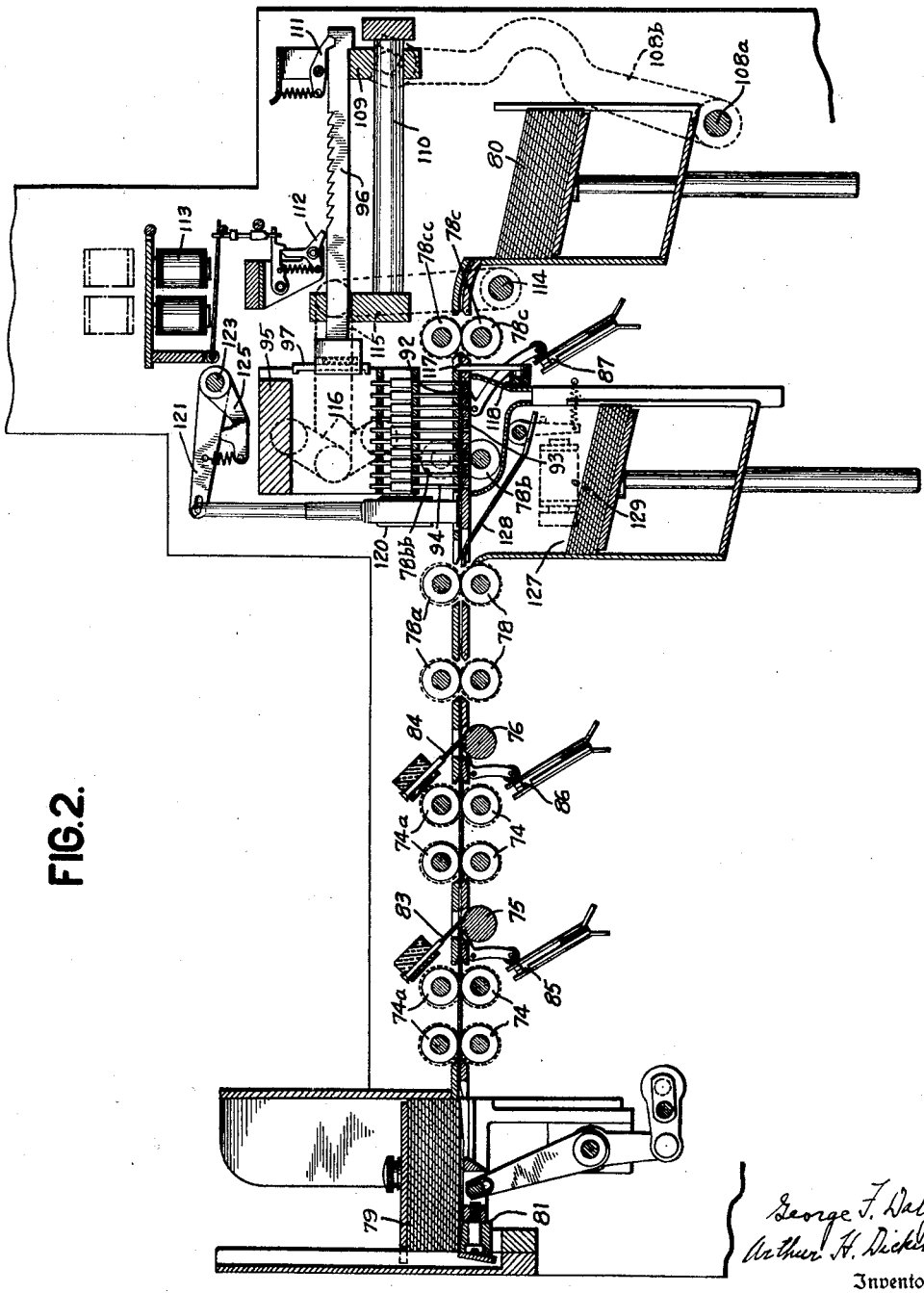
Fig. 3 is an enlarged side elevational view of the card handling, serial numbering and punching section of the machine.
Figure 4:
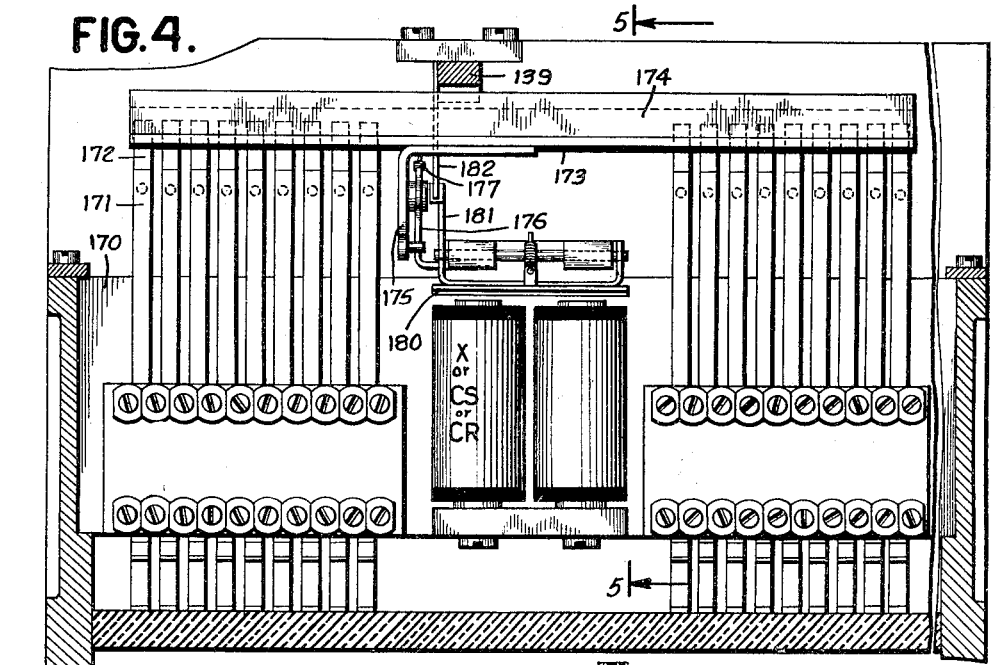
Fig. 4 is an elevational view of one of the electromechanical multi-contact relay devices which are used in the machine for multiplier selection and column selection and control purposes.

The card handling and entry receiving section of the machine is adapted to be driven by a constantly running motor Z (Fig. 1), which motor, through a belt and pulley and ratchet drive drives a shaft 51, which shaft drives an A. C.-D. C. generator 52. The A. C. end of this generator produces alternating current impulses for actuating various counter magnets and relay magnets and the generator also has a D. C. (direct current) takeoff section. Shaft 51, through worm gear drive 53 drives a vertical shaft 54, which shaft, through worm gearing 55 is adapted to drive the main drive shaft 56. The MP, MC, SR and CN receiving devices are driven from this drive shaft in the customary manner. The reset drive is provided for in the following manner. Shaft 56 is provided with a spur gear 57, driving a gear 58 with a four to one drive ratio. Gear 58 has extending from it four Geneva pins cooperating with the cross-element of the Geneva designated 60. Secured to 60 is an internal gear 61 which has cooperating with it a spur gear 62 mounted on the end of the reset shaft 63. The various counters have the usual electromagnetically controlled reset clutches. Shaft 56 extends to the right from the Geneva drive and is adapted to drive a gear 64 (Fig. 1a). This gear has a two to one drive to a gear 65 which is revolubly mounted on card feed drive shaft 66. Fixed to gear 65 is a notched element 67 of a one revolution clutch which is provided with two notches and the complemental parts of this one revolution clutch including pawl 68 and pawl carrier 69 are fixed to shaft 66. The one revolution clutch is engaged by energization of a card feed clutch magnet 70. With the clutch engaged, shaft 66 will rotate and make one revolution while the main drive shaft 56 makes two revolutions. With the clutch disengaged, shaft 66 will be stationary while shaft 56 will continue its rotational movement. Shaft 66 has fast to it a mutilated gear 71 (see Figs. 3 and 3a) which drives a back gear train generally designated 71a (Fig. 3), which in turn drives a sleeve 72 revolubly mounted on shaft 66. The mutilated gear drive is generally similar to that shown in Fig. 8 of Lake U. S. Patent No. 1,757,123. Sleeve 72, through spiral gearing generally designated 73, drives the lower of a set of feed rolls 74 (Fig. 2). Cooperating with the lower feed rolls 74 are upper feed rolls 74a of the usual construction which are preferably gear driven in unison with the lower feed rolls. Contact rolls 75 and 76 are also provided which are driven by gearing extending to certain of the rolls 74a (see Fig. 2). Spiral gearing generally designated 77 drives lower feed rolls 78, 78b and 78c. The upper feed rolls 78a may be positively gear driven in unison with the lower rolls 78 and upper roll 78cc may likewise be positively gear driven in unison with the lower feed rolls 78c. Upper feed roll 78bb preferably is frictionally driven from the lower feed roll 78b and the peripheral velocities of rolls 78bb and 78b are such that the peripheral speed of these rolls is preferably slightly greater than the other rolls of the 78 set. This is for the purpose of urging the card into cooperation with the card stop in a manner to be subsequently explained. Increased peripheral speed may be provided by properly proportioning the relative size of the rolls or by properly proportioning the gearing driving the lower roll 78b. This section of the machine is provided with a card supply magazine 79 and the usual discharge hopper 80 (Fig. 2). A picker 81, which is crank operated in the usual manner is driven in any suitable manner from the driving sleeve 72 as by the driving train 82 shown in Fig. 3. This section of the machine is provided with a set of advance sensing brushes 83 which cooperate with the contact roll 75. A second set of sensing brushes 84 cooperate with contact roll 76. Preferably the drive of rolls 75 and 76 is such that these contact rolls slip slightly relatively to the card to cause a slight creep or slipping action of the card with respect to the contact rolls. The usual card levers operating contacts 85 and 86 are also provided which are adapted to be closed upon the passage of cards thereunder and to open up upon the failure of a card to cooperate with the respective card levers. Another card lever with associated contacts 87 is provided in the punching section of the machine. The arrangement of the card feed drive is such that with the one revolution clutch engaged, the shaft 66 will make a complete revolution during two machine cycles. Upon the first machine cycle and during the first half of a revolution of shaft 66 a card will be withdrawn from the supply magazine 79 and advanced to a point at which it is about to be sensed by the brushes 83. The card remains in such position during the second half revolution of shaft 66 by reason of the mutilated gear drive 71, 71a. Upon the re-clutching of the card feed the card which was previously advanced to the point of cooperation with brushes 83 upon the first half of the revolution of shaft 66 will be traversed past the brushes 83 to a point at which the card is about to be read by the brushes 84. The first card will then remain in this position for the last half of the revolution of 66. Upon the following first half of revolution of shaft 66, with the card feed clutch engaged, the card will be traversed past the sensing brushes 84 and will be picked up by the left hand pair of rolls 78 and 78a and thereafter advanced by the right hand feed roll train which, it will be recalled, is driven directly from shaft 66 through spiral gearing 77. After the card passes the brushes 84 and is picked up by the first of the rolls 78 and 78a the driving relations are such that two machine cycles of shaft 56 and a corresponding single revolution of shaft 66 will produce a card feed, which in extent is double the previous card feed. A card on leaving the right hand pair of rolls 74 and 74a and upon being picked up by the rolls 78 and 78a may be traversed into the punching die or to a reject station as will be subsequently described.

In further explanation of the driving relation of the various feed rolls it may be explained that in one counter cycle, i. e. one revolution of shaft 56, shaft 66 will make one half revolution. Such first half revolution of shaft 66 will impart through the mutilated and back gear train 71, 71a, one complete revolution to sleeve 72. One revolution of sleeve 72 will produce rotation of rolls 74 and 74a to provide for a card travel from one sensing station to the next sensing station. On the right hand end of the machine the driving relation of spiral gearing 77 is such that the first half revolution of 66 will produce an extent of card travel which corresponds in extent to that imparted by rolls 74 and 74a in moving the card from one sensing station to the next sensing station and the second half revolution of 66 will produce a like additional extent of card travel.

The punching die comprises upper and lower die plates 92 and 93. Sets of rows of punches 94 are provided suitably supported for sliding movement in a punch operating frame generally designated 95. A series of interposer selector bars 96 are provided having ratchet teeth thereon, one interposer selector being provided for each row of punches and each selector carrying on its end a punch operating plunger 97, which plunger slides over the tops of the punches 94 and under the top of the punch operating frame 95.

The drive for the punching section of the machine is as follows. Referring again to Figs. 1a and 3, the shaft 56 is provided with a gear 98 which in turn drives a gear 99 freely rotatable on a punch operating drive shaft 100. Gear 99 has fast to it the notched element 101 of a one revolution clutch. The complemental part of this clutch comprises a pawl 102 carried by an arm 103 which is fixed to the shaft 100. This one revolution clutch is of the usual electromagnetically controlled type and when engaged by the energization of the clutch magnet 88 shaft 100 is turned through one complete revolution upon two complete revolutions of the main counter drive shaft 56. On account of the two to one driving ratio, the notched element 101 is provided with two notches to receive the pawl 102 in either of two positions. Shaft 100, near its right hand end, through spiral gearing 104 (see also Fig. 3) drives cams rotatably mounted on a stub shaft 105. The gearing drives an interposer cam 106 and punch operating cam 107. The interposer cam 106 is adapted to shift a crank follower 108 fixed to a rock shaft 108a and through arms 108b shifts a cross-bail 109 back and forth on slide rods 110 (see Fig. 2). The interposers 96 are impositively driven from the cross-bail member 109 in any suitable manner as by spring pressed pawls 111. The interposers are selectively positioned over the punches by means of pawls 112 which engage the ratchet teeth in the top of the interposer bars in the usual manner. Pawls 112 are electromagnetically tripped by punch selector magnets 113. After a given interposer or interposer bars have been selectively positioned under the control of the punch selector magnets, the punches which are under the ends of the punch operating plungers 97 will be positively forced through the card by the punch operating cam 107 (Fig. 3), which cam, through its follower rocks a rock shaft 114, which in turn through arms and linkage 115 is adapted to operate a suitable operating means for the punch frame 95, such operating means being here shown as a toggle 116.

It will be understood that the cards will be picked one by one from the magazine 79 and in one machine cycle the first card will be passed to a position in which the card is about to be read by the set of brushes 83. The card on a latter following machine cycle will pass to the next reading station to a position in which the card is about to be read by brushes 84 and on following machine cycles, it will pass into the punching die. The card is arrested in the punching die by a card stop 117, which card stop cooperates with the pivoted arm 118 (see Fig. 1a), coacting with a cam 119 disposed on shaft 86 (see Fig. 3). With the card stop 117 elevated, the card will be arrested in proper position in the punching die. The feed roll 78b and cooperating roll 78bb may be driven so as to urge the card into cooperation with the card stop and after the card has been intercepted by the card stop, slip relatively thereto before their rotational movement terminates. Upon withdrawal of the card stop after punching and upon resumption of card feed, the card will be ejected from the punching die by the rolls 78b and 73bb and delivered by the right hand rolls 78c and 78cc to the discharge stack 80.

It will be understood that a card is removed from the die plates 92 and 93 during a card feed cycle in which a new card is being advanced towards the die and being sensed and that the one revolution card feed clutch permits a card to be advanced through one station and then arrested for an indefinite number of cycles and that the one revolution punch clutch permits the punch to be called into operation after the requisite number of cycles. Upon the completion of punching, a new card feeding and reading cycle may ensue.

*Serial number printing*

Provision is made in the present machine for imprinting a serial number on the card while the card is in the punching die. For this purpose a serial numbering printing head of conventional construction and generally designated 120 (Fig. 2) is provided. A typical printing head of this type is shown in United States patent to Bates, No. 789,113, dated May 2, 1905. This serial number printing head is carried on a pivoted arm 121 rotatably mounted on shaft 123 and spring connected to an arm 125 which is fast to shaft 123. A linkage 124 connects shaft 123 to the core of a solenoid 122. Upon energization of the solenoid the shaft 123 is rocked to yieldingly draw down the stamp head 120 and imprint the serial number upon the card in the die. Upon each imprinting operation the serial number is changed in the usual manner.

*Card reject devices*

In certain operations of the present machine it is necessary that a card be removed from the run of cards before such card reaches the punching die. For this purpose a card reject box 127 is provided (see Fig. 2) and a deflector vane 128 is provided which is adapted to be elevated up into the card path by energizing magnet 129. With 128 elevated, this deflector will be in the path of the cards and the advancing card will be deflected into the reject magazine 127. Obviously any card which enters the reject box will not be advanced into the punching die and will not receive a serial number imprint.

*Emitters and cam contacts in card handling and entry section*

The main drive shaft 56 is adapted to drive the cams of certain CC cam contact devices, such cams being correspondingly designated on Fig. 1 as CC—1 to CC—3 inclusive. Impulse distributors 134 and 134a are also provided driven in unison with these cam contacts. The usual impulse emitters 135 and 136 are also provided driven from the main drive shaft 56.

Upon a shaft driven with a one to one drive from the shaft 66 in the punching section of the machine (see Fig. 1a) there are provided the cams of a number of FC cam contacts. Such cams are correspondingly designated FC—1 to 19 inclusive on Figs. 1a and 3. The punch operating drive shaft 100 also drives the cams of a PC group of cam contacts. Such cams are correspondingly designated on Figs. 1a and 3 as PC—1 to 4 inclusive.

*Calculating section*

The calculating section is driven from its own driving motor Z—2 and the drive from this motor is substantially the same as the drive previously described for the parts in the card handling section. Corresponding parts will be given the same reference numerals with the suffix b, that is the motor Z—2 drives a shaft 51b which in turn drives a generator 52b. This generator 52b may be identical with generator 52 with a 52AC section marked 52AC—b and a 52DC section marked 52DC—b. Shaft 51b, through gearing 53b drives vertical shaft 54b, which through worm gearing 55b drives the calculating unit main counter drive shaft 56b. A similar Geneva drive 57b, 58b, 60b, 61b and 62b is adapted to drive the calculating unit reset shaft 63b. The drive shaft 56b also extends to the left (see Fig. 1a) and through suitable gearing shown on Fig. 1 drives shaft 56c which in turn drives cams 137 which cams are adapted to operate bell crank follower members 138 and slidably shift serrated operating bars 139 for the multi-contact relay devices. The RH and LH accumulators are driven from the shaft 56b in the usual manner and selective reset is provided by the usual electromagnetic one revolution clutches. The LH accumulator is provided with reset contacts 140 (Fig. 1a) which contacts are arranged to be closed upon the reset of the LH accumulator.

In the calculating unit there are certain CL cam contacts which are designated CL—1 and CL—2 and such cams are driven from the 56b shaft in the usual manner. The calculating unit is also provided with two emitters 141 and 142 which are also driven from the shaft 56b.

The receiving devices and accumulators which are used in both the card handling entry receiving section of the machine and the calculating section of the machine are of the usual type as customarily used in tabulating machines and such accumulators are provided with the usual electromagnetically actuated clutches. The various accumulators and receiving devices have commutator type of readout devices which will now be described.

MP readout

Figs. 6 and 7 show the readout devices MPRO for the MP counter. In Fig. 6, 143 is a clutch gear pertaining to the units order of the MP (multiplier) receiving device. Gear 144 is driven from this clutch gear and this gear in turn drives two brush assemblages, one designated 145U, which traverses a set of segments 146 and also a current supply segment 147. There is another brush assemblage 147U driven by gear 144, the brush of which traverses a segment generally designated 148 and which segment is provided with a single conducting spot at the zero position. The brush 147U also traverses a common supply segment 149. There is a similar brush 147T which is positioned from the tens order clutch wheel 150 and which also traverses the segment 148 which contains only the single conducting spot at the zero position. Brush 147T also traverses a separate common current supply segment 151. Similarly there is a brush 145T driven in unison with brush 147T and which brush 145T traverses the segment spots 152 and which receives current from the common current supply segment 153. This arrangement of brushes and segments is repeated for the higher orders in the MP readout device, i. e. each alternative segment is like 148 with only a zero spot in the zero position. Alternating with these segments are alternating segments similar to 146 and 152 with a multiplicity of spots on each segment.

The detailed construction of this readout with its brush assemblage, segments, etc. is shown in the cross-sectional view Fig. 7.

The wiring of the readout will be shown in connection with the circuit diagram.

MC readout

Referring now to Figs. 8 and 9, in Fig. 8 is shown the brush driving arrangement for the MC readout. With this readout the units clutch train 154 drives a units brush assemblage 155U which cooperates with a set of segments 156 and which brush receives current from a common conductor segment 157. Similarly the units driving train 154 drives a brush assemblage 155T receiving current from a conductor segment 158 and cooperating with segment spots 159. Also cooperating with the segment spots 159 is another brush assemblage 160T receiving current from a conductor segment 161 and which brush is driven from the tens order clutch train 162. This arrangement is repeated for relatively higher orders.

Fig. 9 shows the detailed mechanical construction.

RH, LH, SR and CN readouts

Fig. 10 shows the general arrangement of the readouts for the RH accumulator, the LH accumulator and the SR counter and the CN receiving device. With a readout mechanism of this sort, it will be noted that the segment spots 163 are common to two sets of brush assemblages designated 164 and 165 respectively, and which brushes cooperate respectively with the common conducting segments 166 and 167. Brush 164 is driven from the units order clutch gear train 168. Brush 165 on the other hand is driven from the tens order clutch train 169. A similar arrangement of brushes and readout spots is provided for the relatively higher orders for these accumulators and counters and the wiring of these readouts is shown on the circuit diagram. In Fig. 10, nine segment spots 163 are shown. This arrangement is for the RHRO device only. The LHRO, the SRRO and the CNRO all have ten segment spots.

Fig. 11 shows the mechanical details of construction.

Multiplying panel and column shift controlling relays

Figure 5:
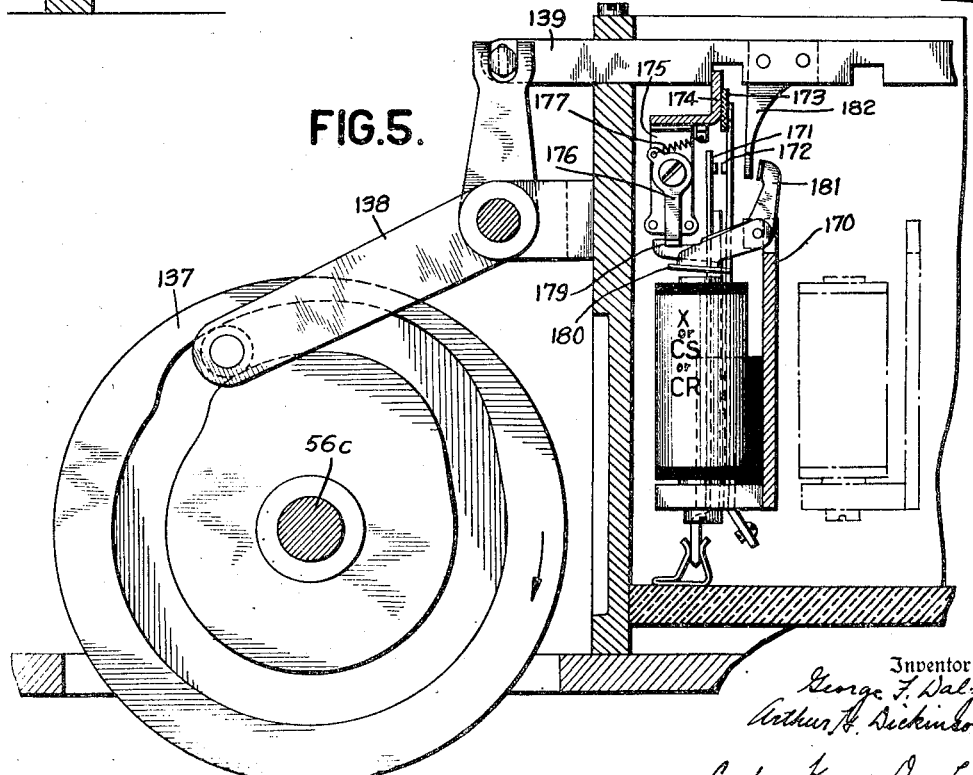
Fig. 5 is a sectional view taken substantially on line 5—5 of Fig. 4 but with the parts in a displaced position showing the manner in which strain is relieved from the latch point of the armature.

The calculating section of the machine is provided with electromagnetically controlled and mechanically positioned and restored multi-contact relays. These relays are mounted on vertical plates 170 which are suitably carried in slots in the frame part of the machine. Carried on each plate is a magnet which will be designated CS when the relay is to be used for column shift purposes and X—1, X—2, X—3, etc. when the relay is to be used for multiplier selection purposes and CR when the relay is to be used for simple multiple circuit control purposes. Such magnets when energized serve to control the establishment or breaking of circuits at the multi-contact points of the relay. Each plate 170 has mounted upon it multi-contacts generally designated 171 and 172. Contacts 172 have fastened thereto a strip of insulating material 173 carrying an L shaped member 174, which member engages into the downwardly extending serrated notches on the serrated bar 139. Member 174 also carries a bracket 175 having pivotally mounted thereon a latch member 176. The latch member has slight limited rocking movement between limiting stop pins and is normally urged clockwise by a spring 177. A part of the latch member 176 cooperates with a latch piece 179 fixed to a pivotally mounted armature 180. 180 also has a tail portion 181 arranged in cooperative relation to a restoring abutment 182 fixed and depending from the serrated operating bar. With the parts in the position of Fig. 5, a cam 137 has shifted its follower 138 and the operating bar 139 to a position in which contacts 171 and 172 are kept open and to a position in which the strain is removed between the latch 176 and the latch point 179 of the armature assemblage. The relay magnet may now be energized causing latch portion 179 to be lowered and allowing latch 176 to trip over the top of the latch point. Thereafter upon further rotational movement of cam 137, the bar 139 moves to the left and allows contacts 172 and 171 to close under their own spring action. If a set of multi-contacts have been tripped and closed the operating cycle of the machine ensues and ultimately the cam 137 again shifts its follower, causing the bar 139 to take a sufficient movement to the right to cause the armature knockoff bracket 182 to intercept 181 and knock off any previously attracted armature. Subsequent movement of the parts allows the serrated bar to move back to the Fig. 5 position. If a magnet be not energized, its corresponding armature will not be attracted and the latch member 179 will then prevent a closure of contacts 171 and 172.

In the subsequent description of the wiring diagram the multi-contacts which have been generally designated 171 and 172 in the mechanical description will be given designating reference numerals related to their associated control magnets. Thus 1—CR1 to 17 will designate the seventeen contacts controlled by the magnet 1—CR, etc.

Before describing the circuit diagram, it may be explained that the machine is adapted for functioning under various operating conditions and with cards perforated in various manners and variously arranged in groups. Accordingly, a brief résumé will be given first of the various operating conditions and the different arrangements of cards for the different operating conditions.

*First condition.*—Operating under the first condition, the cards will be arranged in groups. The first card of a group will contain a multiplier amount and a control number only, but no multiplicand amount will appear on such first or leading card of a group. The detail cards of the first group will contain multiplicand amounts and control numbers only. Following the first group, the leading card of the following group will contain a new multiplier amount and a new control number, but no multiplicand amount. The other cards of the second group will be detail cards, each containing a control number and a multiplicand amount. Operating under this condition the machine multiplies the multiplicands derived from each of the detail cards of a group by the multiplier amount derived from the leading card of the group and upon encountering a card with a new multiplier and with a change in control number the machine takes in the new multiplier amount and the new control number and proceeds with the computation on the following detail cards of that group. If the control number changes on a detail card, such erroneous or misplaced detail card will be automatically rejected.

When operating under condition one, punching is suppressed on the leading card of a group and if serial number printing is being effected provision is made for suppressing serial number printing on the leading card of such group. Entries into the serial number counter are also suppressed for the leading cards of a group. In short, the serial numbering means is operative for the detail cards only. When a misplaced detail card is rejected there is no entry of serial number or serial number printing, such operations being automatically suppressed.

*Second condition.*—When operating under this second condition the first card of each group will have perforated thereon the amount of the multiplier, the amount of the multiplicand and the control number and the detail cards of each group will have perforated thereon the amount of the multiplicand and the control number but no multiplier amount. Operating under this condition the machine is arranged to automatically reject a card if the control number changes upon a detail card which contains no multiplier amount. However, if the control number changes on a card containing a multiplier amount the machine automatically takes in the new multiplier and a new control number and procceds with the computation upon the first card of the group and upon the following cards of the same group. When operating under condition two, computing result punching and serialing operations are performed upon the first card of the group as well as upon the detail cards and accordingly serial number printing and punching may be effected on all cards except misplaced detail cards.

*Third condition.*—Operating under this condition the cards will still be arranged in groups, each group containing a leading card containing a multiplier amount only. The following cards of each group will be detail cards containing multiplicand amounts only. Operating under this condition upon the first card of a group passing into the machine the multiplier amount appearing thereon will be taken in by the machine. This multiplier will be used to multiply all of the multiplicand or detail cards of that group and upon the entrance of a new multiplier card, the old multiplier would be cleared out and a new multiplier taken in and such new multiplier would be used to multiply all the multiplicand amounts on the following detail cards of the group. Operating under this condition it is unnecessary to provide for the elimination of misplaced detail cards. Operating under this condition punching and serial numbering operations may be suppressed on the first card of each group and there is no serial number entry for the first card of each group.

*Fourth condition.*—Under this kind of machine operation each card contains a multiplier amount which also serves as a control number. The leading card of the group contains a multiplier amount only. The following detail cards of the group contain both multiplier and multiplicand amounts. Operating under this condition, the multiplier amount is intended to be the same for all the cards of a run, but if a card with a different multiplier is present in the run, such card will be automatically rejected and the machine will proceed with the operation on the following cards. If a card enters the machine with a new multiplier amount only appearing thereon, it indicates to the machine that the old multiplier is to be cleared out and a new multiplier taken in and set up as a control number for the following cards. Operating under this condition result punching is suppressed on the leading card which contains a multiplier amount only. Serial number entry and serial number printing are also suppressed for such leading cards.

*Fifth condition.*—Condition five is substantially similar to condition four above set forth, but the leading card of each group is punched with a perforation at either of the 11th or 12th index point positions to designate that this card is the first card of a group. Under this condition this extra punching indicates that a new multiplier amount is to be taken in and as in condition four, if the multiplier derived from any detail card does not compare with the multiplier derived from the leading card the card is automatically rejected. The punching and serial numbering controls are the same as with condition four.

*Sixth condition.*—Operating under condition six, each card contains a control number, a multiplier amount and a multiplicand amount. Operating under this condition if the control number on any card does not compare with the control number derived from the first card of the run the erroneous or misplaced card will be automatically rejected. Serial number printing and product punching is effected on all computed cards, but of course is suppressed on the rejected cards.

*Seventh condition.*—In operating under condition number seven, control numbers do not appear on the cards, each card containing a multiplier and multiplicand amount. Result punching and serialling are effected for all cards.

Switches

Before describing the circuit diagram, it may be explained that the present machine contains a great number of switches which may be differently set for different operating conditions. The switches are designated 201 to 219 inclusive. For operating condition number one, switches 201 and 208 (Fig. 12a) are in open position and on Fig. 12b, switches 204, 206 and 207 are in open position. On Fig. 12b switches 202 and 203 are in their intermediate off position. On Fig. 12b, switches 205, 209, 210, 211 and 217 are in closed position. On Fig. 12b, switches 212, 213, 214, 215 and 216 which are two-point switches, are thrown to the position shown on the diagram. The switches 218 and 219 (Figs. 12a and 12d) are the main line switches which when closed supply current to the motors Z and Z—2, and set into operation the A. C.-D. C. generators 52 and 52b.

Circuit diagram

Before starting up the machine, pre-punched cards are placed in the supply magazine 79 of the machine with the cards perforated and arranged according to condition one above set forth. With the 52—D. C. generator in operation direct current will be supplied to the buses 220 and 221 and the A. C. section of this generator will supply alternating current impulses to bus 222 and to ground. The 52b generator on its D. C. end supplies direct current to buses 223 and 224. The A. C. end of the 52b generator supplies alternating current to bus 225 and to ground.

Before depressing the start key the switches 201 to 217 will be adjusted to the positions previously described and prior to starting up the machine the operator will have plugged up certain circuits of the machine as will now be described.

Plugging

Referring to Fig. 12a the advance sensing brushes 83 are individually wired to plug sockets 226. The sockets 226 which pertain to the multiplier field of the card are wired by plug connections to sockets 227. A plug connection is also made from one of the sockets 228 to plug socket 229 which is wired to cam contacts FC—2. Each of the brushes 84 at the second reading station is wired individually to a plug socket 230. From the plug sockets 230, which pertain to the multiplier field of the card, plug connections are made to sockets 231 which are respectively wired to the 232MP magnets. From the sockets 230, which pertain to the multiplicand field of the card, plug connections are made to the 233 sockets which are wired to the 232MC magnets. The sockets 230, which pertain to the control number field of the card, are plugged by plug connections to sockets 234 which are wired to the center blades of three-blade contacts devices G—3 to G—10 inclusive. Wiring from one set (the upper set) of the three-blade contacts extends to a plug board 235 provided with double plug sockets and wiring from the lower of the three-blade contacts G—3 to G—10 extends to plug sockets at a plug board 236. Plug connections are provided at plug board 235 and 232CN magnets. Plug connections are made at plug board 236 to the pick-up coils 237 of the control number comparing unit. The other end of the coils 237 extends to plug sockets 238 and from these sockets plug connections are made to plug sockets 239 which are wired to the CNRO readout.

Referring to Fig. 12b, suitable plug connections are also provided from the plug sockets 240 to the sockets 241 which are wired to the punch selector magnets 113. One or more other plug connections are also made from plug sockets 242 to certain ones of the sockets 241 to permit punching of a serial number if this is desired. The connections from sockets 240 to 241 are for product punching.

Automatic control unit

Before describing further operations, the automatic control unit will be briefly described (see Fig. 12a). The purpose of this control unit is to compare the control member which is read from a card with a previously entered control number. In describing the automatic control unit it will be assumed that the control number is already in the CN receiving device and that the brushes of the CNRO readout are positioned in accordance with such entered control number. As a card passes the second set of sensing brushes 84, the brushes 84 which pertain to the control number field of the card will, through the plug connections at plug board 234 and the plug connections at plug board 236, cause an energization of the pick-up coils 237. The energization of any coil 237 will close its related contact 243 and energize a related holding coil 244 which will maintain the related stick contacts 243 closed. The pick-up circuit from the brushes is from bus 222 (Fig. 12a), through relay contacts C—2, cam contacts FC—8, via impulse distributor 134a to contact roll 76, thence through a brush 84, through the plug connections and circuits previously traced to a particular coil 237 and through the column of the CNRO readout, out via impulse emitter 135 and back to ground. In order for a given pick-up coil to be energized, the card perforation in a given column must correspond with a number set up on the CN counter in the corresponding column. The circuit for energizing a given holding coil 244 is from DC bus 220, through a given holding coil, through contacts 243, through cam contacts FC—10 which are closed at this time and back to the 221 side of the DC line. With a given holding coil 244 energized, a related contact 245 is closed. The various 245 contacts pertaining to various orders of the control unit are disposed in a series comparison circuit which extends serially through all of the contacts 245. If a control number were to be an eight column control number the plug 246 would be left in the position shown, but if one or more columns were to be eliminated this plug would be placed in a related socket 247 to plug out one or more columns of the control unit. Upon a comparison control being made all of the contacts 245 will be closed and upon the closure of cam contacts FC—11 a circuit will be established from the 220 side of the DC line through all of the closed 245 contacts, through relay coil J and back to the 221 side of the DC line. The energization of relay coil J closes contacts J—1 and establishes a stick circuit for J back through cam contacts FC—12. A relay type of control unit of this general form is more fully described in the United States patent to Gunne Lowkrantz and C. D. Lake, No. 1,987,343.

Operation

The operations under condition "one" will be first described with the assumption that there are no misplaced detail cards in the run.

With cards properly punched and in the supply magazine 79 and with the machine plugged up and with the switches positioned as previously described, the start key 250 (Fig. 12b) may be depressed to energize relay coil A. The energization of relay coil A closes relay contacts A—2 and energizes the card feed clutch magnet 70 through a circuit which extends from the 221 side of the DC line, through 70, through A—2, through relay contacts D—1 now closed, cam contacts FC—1 to the other side 220 of the DC line. A card feed cycle now ensues and the first card will be withdrawn from the magazine and advanced to a point where the nine index point position of the first card will be about to be sensed by the brushes 83. The start key is now depressed a second time or alternatively it may be maintained depressed to initiate a second card handling cycle to carry the first card past the brushes 83 and to a position in which the perforations of the first card are about to be sensed by the brushes 84. This card feeding operation carries the second card of the run or first detail card to the first sensing position adjacent brushes 83. When the first card approaches the first sensing station, card lever contacts 85 (Figs. 2 and 12b) become closed causing energization of relay coil B. The energization of relay coil B closes relay contacts B—1 to provide a stick circuit for relay coil A through the stop key contacts 251 and relay contacts A—1. Under the number one type of operation the first card of a group will contain the control number and the amount of the multiplier. As the leading card with the control number amount and the multiplier amount thereon passes the brushes 83, the presence of a perforation in the multiplier field will cause the establishment of a brush circuit through the brushes which are wired to plug sockets 227 and thus energize relay coil E. The circuit is from the 222 side of the AC line, through relay contacts B—2 (closed by the energization of relay coil B), through impulse distributor 134, contact roll 75, sockets 226 pertaining to the MP field, sockets 227, through relay coil E, through a plug connection from a socket 228 to 229 and back through cam contacts FC—2 which are closed during the sensing of the multiplier field of the card from index point 9 through 1 and back to ground, through normally closed relay contacts L—2. The energization of relay coil E in this manner thus signifies that the card which has been sensed, contains a multiplier amount.

The energization of relay coil E closes relay contacts E—1 (Fig. 12b) to effect energization of relay coil F. Energization of relay coil F closes stick contacts F—1, a stick circuit being established back through cam contacts FC—5 which are closed at this time. After relay coil F has become energized and late in the cycle in which F is energized, cam contacts FC—6 become closed to effect energization of relay coil G. Relay coil G is a holding relay coil which may be maintained energized after F becomes de-energized. The holding circuit for G is through relay contacts G—1 and cam contacts FC—7. Directly after the energization of relay coil G, cam contacts FC—5 open to effect de-energization of F by breaking the holding circuit therefor. It may be explained that relay coil G is energized at the time that the first card is about to traverse the brushes 84 (Fig. 2) provided the first card contains a multiplier amount.

The machine is now ready for a further card feed cycle and during this further card feed cycle the control number is entered into the CN receiving device and the amount of the multiplier is entered into the MP receiving device. This following card feed cycle is initiated in the following manner. The start key is now depressed a third time or alternatively it may be maintained depressed until the leading card approaches brushes 84 and card lever contacts 86 (Figs. 2 and 12) become closed, causing relay coil C to become energized. The energization of relay coil C closes relay contacts C—1 to maintain the stick circuit for relay coil A which in turn controls the energization of card feed clutch magnet 70. It will be understood that as long as cards are passing relay coil A will be maintained energized provided either contacts C—1 or B—1 are closed.

The entry circuits for the introduction of the control number and the multiplier will now be traced.

The energization of relay coil G in the manner previously explained will have shifted relay contacts G—2 and G3—10 (Fig. 12a) to the reverse position from that shown. Current supply is afforded from the 222 side of the AC line through relay contacts C—2 now closed, cam contacts FC—8 to the impulse distributor 134a, to contact roll 76 and via plug connections from the sockets 230 pertaining to the MP field to sockets 231 and thence through the 232MP counter magnets and back to ground through the now shifted G—2 contacts. The control number entry circuits are from the brushes at the control field and sockets 230, via plug connections to sockets 234 via the shifted G3—10 contacts to plug board 235 and through the plug connections at this plug board to the 232CN magnets and back to ground.

The above described operations will have entered the amount of the multiplier from the leading card into the MP counter and the amount of the control number from the leading card into the CN receiving device.

After the entries have been made in the MP and CN counters, cam contacts FC—9 close to transfer the relay control action from the G relay to the H relay for controlling following operations. Upon the energization of H a stick circuit is established through relay contacts H—1 and PC—1 (Fig. 12b). Following the energization of H, relay coil G becomes de-energized due to the opening up of cam contacts FC—7.

After the control number and the multiplier amount have been read from the leading card the card advances in the feed roll train 78 and 78a and the leading card is advanced into the punching die. Upon the leading card reaching the punching die contacts 87 close energizing relay coil D. With D energized contacts D—1 open to prevent further card feed when FC—1 close. During the feed of the leading card the deflector vane 128 will be in the position shown out of the path of the card run and accordingly the leading card will not be deflected. The energization of relay coil H will have closed relay contacts H—4 (Fig. 12b) and with these contacts closed a circuit is established from the AC bus 225 in the calculating unit (Fig. 12d), via wire 252, over through switch 212 in the position shown, through relay contacts H—4, through cam contacts FC—16 which close at the proper time in the cycle and back through wire 253 to the 254LH reset magnet in the calculating unit. The LH accumulator is now reset. Reset of the LH accumulator closes the 140 reset contacts (Fig. 12c) and energizes relay coil M to set up the cycle controller. Upon the energization of relay coil M it is maintained energized by the closure of stick contacts M—1 which establish a stick circuit through contacts 1—CR—17 now closed. Under this type of operation which is being described, the leading card contains no multiplicand amount. Accordingly the MC counter stands at zero and dummy multiplying cycles ensue, the machine making an attempt to multiply a zero amount in the multiplicand counter by the amount of the multiplier. Such dummy multiplying cycles need not be described further since there is no actual entry made into the LH and RH counters of the machine during such dummy multiplying cycles, but the operating time is used up for such dummy multiplying cycles. When dummy multiplying cycles are complete the usual sequence circuit through the Y$u$—2, Y$t$—2, Y$h$—2, etc. contacts of the cycle controller is completed and ultimately relay coil I—CR (Fig. 12$d$) becomes energized. Energization of I—CR closes contacts I—CR I to 16 and the machine makes an idle effort to transfer the amount from the RH counter into the LH accumulator. No actual transfer occurs since there is no amount standing on the RH accumulator at this time. The energization of relay coil I—CR allows contacts I—CR—17 (Fig. 12$c$) to open to break down the setup of the cycle controller. When relay coil I—CR is energized in the manner previously explained, contacts I—CR—19 (Fig. 12$d$) close and when cam contacts CL—I in the calculating unit close, a circuit is established from the DC bus 220 (Fig. 12$b$) through wire 255, through contacts I—CR—19 (Fig. 12$d$), through cam contacts CL—I, back via wire 256 to the punch clutch magnet 88 in the card handling unit. A cycle of the punching mechanism now ensues but there is no punching on this leading card because the relay coil H is still energized to keep open contacts H—2 (Fig. 12$b$) and break the return circuit from the punch selector magnets 113. Accordingly, the punch selector interposers pass beyond the zero position to a blank position beyond the punches and no punching is effected on this leading card. In due course, upon the next card feeding cycle, the leading card is discharged to the discharge magazine.

It may be explained that no serial number entry is effected in the serial number counter and no operation of the stamping head is effected for this first card since the circuit to the serial number counter magnet 232SR (Fig. 12$b$) and the circuit to the stamp head operating magnet 122 cannot be completed under this type of operation. It may be explained that with this kind of an operation on the leading card, contacts J—2 and J—3 (Fig. 12$b$) are both open. With J—2 open and with switch 203 in its intermediate open position, no circuit is completed to 232SR when cam contacts FC—13 close. Accordingly, no serial number entry is made in the serial number counter. With contacts J—3 open and with switch 202 in its intermediate open position, the circuit to the stamp head operating magnet 122 is not completed at the time cam contacts FC—14 close.

Late in the cycle of operation of the punching section, cam contacts PC—1 (Fig. 12$b$) open to break the stick circuit for relay coil H.

The machine has now reached a stage in its operation where it is ready to read the second card or the following detail card of a group on which the multiplicand amount and the control number appears. On this reading operation, the control number derived from the detail card is compared with the control number previously entered into the machine from the leading first card and the amount of the multiplicand is entered into the multiplicand counter. Late in the cycle of operation of the punching section, cam contacts PC—2 close to energize the card feed clutch magnet 70 to initiate a card feed of the first detail card. The ensuing card feed cycle traverses the detail card past the brushes 84. The multiplicand amount is entered into the multiplicand receiving device through plug connections made from sockets 230 which pertain to the multiplicand field to sockets 233. A return circuit is provided from the multiplicand receiving device magnets to ground through relay contacts G—2 which have now reassumed the position shown. Likewise the three-blade contacts G3—10 have reassumed the position shown and accordingly the control number which is read in by the brushes pertaining to the control field of the card causes operation of the control unit in the manner previously described to compare the control number previously read to the CN receiving device and which is set up on the CNRO readout with the new control number read from the detail card. Assuming that the control number compares, relay coil J becomes energized in the manner previously explained. On the failure of a comparison there is no energization of relay coil J. If relay coil J becomes energized, several actions ensue. The energization of J will open up relay contacts J—4 (Fig. 12$b$) and prevent the deflector magnet 129 from becoming energized so that the detail card on which the control number compares will not be deflected to the reject box but will proceed into the punching die. The fact that the control number which is on the detail card has compared with the previously read in control number determines that a multiplying computation has to be performed upon the multiplicand amount derived from the first detail card, that a serial number entry has to be made into the serial number counter; that serial number printing is to be effected on this detail card and that serial number punching is later to be effected on the first detail card if the machine is intended to effect such serial number punching.

Multiplication operations are initiated in the following manner. The energization of relay coil J (Fig. 12$a$) causes closure of relay contacts J—5 (Fig. 12$b$) to permit the establishment of a circuit to the 254LH reset magnet (Fig. 12$d$) upon the closure of cam contacts FC—16 (Fig. 12$b$). The energization of 254LH initiates the reset of the LH accumulator and upon the reset of the LH accumulator the cycle controller is set up in the manner previously described. With relay coil J energized, relay contacts J—2 (Fig. 12$b$) become closed and remain closed until cam contacts FC—13 close at the one index point time in the operation of the SR counter. Accordingly, the closure of FC—13 energizes the units order magnet 232SR and enters one into the serial number counter. With J energized and maintained energized, relay contacts J—3 (Fig. 12$b$) become closed and cam contacts FC—14 close at a time when the detail card is fully in the punching die (see Fig. 2). Upon closure of FC—14 the stamp head solenoid 122 is energized and an imprint of the serial number is made on the detail card in the punching die. After the various operations controlled by relay coil J have been completed, cam contacts FC—12 (Fig. 12$a$) become open to de-energize relay coil J.

*Multiplying operations*

With the cycle controller set up by the energization of relay coil M (Fig. 12$c$) in the manner previously described current is supplied through a wire 257 (Fig. 12c and Fig. 12a) to the zero bus of the MPRO readout in the card handling section (Fig. 12a) and through any brush or brushes standing on a zero or zeros via wires in a cable 258, back to the calculating section of the machine to the related Y magnets designated Yu, Yt, Yth, etc. With any Y magnet energized its respective stick contacts (with suffix "1") will be closed, that is if the units order brush is standing on a zero spot, stick contacts Yu—1 will be closed to maintain Yu energized. It will be assumed that there is a zero in the units order of the multiplier and that the amount in the tens order of the multiplier is 2 and in the hundreds order is 3. Under these conditions transfer contacts Yu—2 (Fig. 12d) of the cycle controller will be shifted and contacts Yt—2 will be in the position shown. Relay contacts M—2 will also be closed. Upon the closure of cam contacts CL—2 (Fig. 12d) in the calculating unit, a circuit is established from the 225 AC line, through CL—2, through wire 259, over through the relay contacts M—2, through the shifted Yu—2 cycle controller transfer contacts, through the non-shifted Yt—2 contacts, through the CSt column shift relay magnet and back through a wire in a cable 260 (Figs. 12d, 12b and 12a), to the tens order section of the MPRO readout, through the brush of this readout, which is standing say on the number "2" spot, back through the number "2" wire in cable 261, again over to the calculating unit (see Fig. 12c) and down through the X—2 multiplier relay magnet and back to ground. Energization of the X—2 relay magnet controls the entries for the multiplying computation by two and the energization of CSt directs the partial product entries into the proper columnar orders of the RH and LH accumulators. When the multi-contacts of the CSt relay close, an extra contact pair CSt—3 (Fig. 12c) is also closed. The closure of this CSt—3 contact pair which takes place as an incident to the flow of current to the X—2 magnet through CSt, causes the energization of the Yt relay, which relay was not previously energized because its corresponding readout brush did not stand on a zero spot. The energization of Yt then shifts the relay contacts Yt—1 and Yt—2 so that upon the succeeding multiplication by the next significant figure, current flowing in through CL—2, 259 and M—2, will be diverted by Yt—2 over to the Yh—2 set of contacts which are in the position shown (the coil Yh not having been previously energized, since its corresponding readout brush did not stand on a zero spot). The current impulse then flows through CL—2, 259, M—2, Yu—2 and Yt—2 (in shifted position), through Yh—2 (in the position shown), through CSh, to a wire in cable 260, over through the brush of the MPRO readout (Fig. 12a) which stands on the "3" spot, through the number "3" wire in cable 261 and back to the X—3 multiplier relay magnet and to ground (Fig. 12c). This current flow will effect an energization of the X—3 relay magnet and of the CSh magnet and the energization of CSh will direct a proper entry of the partial product amounts into the LH and RH accumulators at a shifted over columnar relation therein.

It may be stated that the energization of the X magnets of the multiplying relays establishes their related contacts shown on Fig. 12c and that at the proper time in the operation of the machine current impulses flow from the emitter 141 through the multiplying relay control contacts. Such impulses flow over the LH lines 262LH and the RH lines 262RH which extend into cables 263LH and 263RH to the LH and RH sections of the multiplicand readout MCRO (Fig. 12a), in the card handling section. The multiplicand readout device allows selected impulses to flow to the LH and RH component lines 264LH and 264RH which extend through correspondingly numbered cables, over to the calculating unit (see Fig. 12c) and to the various multi-contacts of the CS relays which are wired as shown in Fig. 12c. The opposite sides of the multi-contacts of these relays connect to the LH lines 265LH and to the RH lines 265RH. The latter lines connect to the magnets 232RH pertaining to the RH accumulator. The 265LH lines extend down (see Fig. 12d) and connect to transfer lines 266 which extend to the 232LH magnets. Partial products are entered into the LH and RH accumulators and as successive multiplying cycles ensue there is a selective energization of the CS relay magnets to direct the entries into the proper and shifted orders of the accumulators.

Upon completion of the complete multiplying computation, all the Y—2 set of contacts will have been shifted to reverse position from that shown so that upon closure of cam contacts CL—2 (Fig. 12d) there is a circuit from the 225AC line, through CL—2, wire 259, through relay points M—2 now closed, through all of the Y—2 set of contacts now in shifted position, to the 1—CR relay magnet. The energization of 1—CR, among other things, controls the transfer of entries from the RH accumulator to the LH accumulator. Energization of 1—CR (Fig. 12d) permits closure of the related contacts 1—CR 1—16 and 1—CR—18 and 1—CR—19. Closure of 1—CR—1 to 16 connects the RHRO readout with the 266 transfer lines. Accordingly, upon the operation of the emitter 142, impulses are emitted through the RHRO readout devices through the 1—CR—1 to 16 set of contacts, through the transfer lines 266 to the LH accumulator magnets 232LH. By this operation the amount previously standing in the RH accumulator is entered into the LH accumulator in proper columnar relation therein.

The energization of 1—CR brings about opening of contacts 1—CR—17 (Fig. 12c) to break down the setup of the cycle controller. The closure of 1—CR—18, upon the brush of the emitter 142 encountering the extra spot, causes the energization of the 254RH reset magnet to initiate reset of the RH accumulator. The closure of contacts 1—CR—19 (Fig. 12d) upon the closure of cam contacts CL—1 establishes a circuit to the punch clutch magnet 88 (Fig. 12b) to initiate an operation of the punching section of the machine.

The computed product will have now been completely set up in the LH accumulator and the machine is ready to punch this product back upon the first detail card. With the punching section of the machine in operation, cam contacts PC—4 (Fig. 12b) close and permit completion of a circuit from the 222AC line to the 136 emitter. This emitter emits impulses to wires in a cable 267 which extends over to the transverse buses of the SRRO readout and to the transverse buses of the LHRO readout (see Fig. 12d). The emitter 136 emits impulses through both the SRRO readout and the LHRO readout and selected impulses flow back from the LHRO readout, through wires in cable 268, down to the plug sockets 240 (Fig. 12b) which are wired up by plug connections to certain of the punch selector magnets 113. The impulses which are emitted through the SRRO readout flow through the readout and selected impulses flow out of this readout through the plug connections extending from 242 to selected sockets 241. The circuit through the punch selector magnets is completed through relay contacts H—2 which are closed at this time. By the energization of the punch selector magnets, certain interposers in the punch are set up for subsequent punching of the product and other interposers are set up for punching the serial number. Further operation of the parts in the punching unit effects the punching of the product and of the serial number. During the operation of the punching section of the machine cam contacts PC—3 (Fig. 12c) close to establish a circuit to the multiplicand reset magnet 254MC. Upon energization of this reset magnet, reset of the multiplicand counter is effected in the usual manner. The reset circuit just briefly described is traced as follows: From the 222 side of the AC line (Fig. 12b), through relay contacts C—5 now closed, through PC—3 now closed, through relay contacts G—11 now in the position shown directly to the 254MC reset magnet and back to ground. It may be explained that the MP and CN receiving devices are not reset at this time, the circuits not being completed to their reset magnets 254MP and 254CN. Late in the punching cycle, cam contacts PC—2 (Fig. 12b) close and a circuit is established from the 220 side of the DC line, through relay contacts A—2 to the card feed clutch magnet 70. A card feed of a following detail card now ensues. Comparing operations ensue and there is a further multiplying, recording and serialling operation, etc. on the following detail card. These operations are repeated for successive detail cards so long as the control numbers compare or until a new leading card of a new group enters the machine.

*Operations upon reading new leading card*

When a new leading card enters the machine, which card it will be recalled is a card which has on it both a control number and a multiplier amount, machine operations are automatically changed. The entrance of a new leading card into the machine modifies the machine operations in the following manner. As operations are being performed on the preceding detail card, the new leading card will have been sensed by the advance sensing brushes 83 and the presence of a multiplier in this new leading card will be ascertained by the machine. Under this condition the machine not only resets the multiplicand receiving device but also automatically effects a reset of the multiplier receiving device and of the control number receiving device so that the new multiplier appearing on the leading card and the new control appearing thereon can be entered in their respective counters. The entry of the new multiplier and control number follows the resetting operation upon the following card feed cycle.

Referring to Fig. 2 it will be assumed that the new leading card is in position about to pass brushes 83 and that the last preceding detail card is about to pass brushes 84. On the card feed following the brushes 83 sense that a new multiplier is present on the leading card. The effect of such sensing is to cause energization of relay E (Fig. 12a) in the manner previously described. The effect of the energization of the E relay coil is to close contacts E—1 (Fig. 12b) and to effect energization of relay coil F. The energization of F transfers its control over to relay G when cam contacts FC—6 close and relay coil G effects closure of contacts G—1 and coil G is maintained energized so long as cam contacts FC—7 are closed. With G energized under this condition it is maintained energized until the proper entries have been made from the new leading card. With relay coil G energized, contacts G—11 and G—12 (Fig. 12b) are shifted to reverse position from that shown in the circuit diagram (Fig. 12b). Accordingly, with relay contacts C—5 closed and upon closure of cam contacts PC—3 during the punching operations on the preceding detail card, current flows through the now shifted G—11 contacts over wire 270, via the jumper to wire 271 and thence through switch 209, in the position shown, to the 254CN reset magnet. Current also flows directly to the 254MP reset magnet and through relay contacts G—12 to the 254MC reset magnet. With these various reset magnets concurrently energized in this manner there is a reset of the MC, CN and MP receiving devices. The various receiving devices are now reset and are ready to receive a new multiplicand, a new multiplier and a new control number. The new leading card is now in a position about to traverse the brushes 84. The relay coil G is still maintained energized upon the following card feed cycle and accordingly contacts G—2 (Fig. 12a) are in shifted position and contacts G—3 to G—10 are in shifted position. Accordingly, upon the traverse of the new leading card past the brushes 84, the new multiplier is entered into the MP counter, the circuit to ground from the magnets 232MP being completed by contacts G—2 and the new control number is entered into the CN receiving device by the energization of the 232CN counter magnets. The operations which follow the entry of a new multiplier and the new control number are the same as previously described for the first leading card of the first group.

*Operations upon change in control number on detail card (misplaced card)*

The next operation to be described will be those occurring on the entrance of a misplaced detail card or cards into the machine with such detail cards not followed by a leading card. Operating under these conditions the machine automatically ascertains the presence of such misplaced detail card or cards in the run and automatically delivers such misplaced cards to the reject box. Since the reject box is ahead of the punching station; obviously no punching is effected on the misplaced detail cards. No serial number printing or punching is effected thereon and provision is made for preventing the setting up of the serial number counter for such misplaced detail cards. In other words, the misplaced cards are not counted. Upon misplaced detail cards there is furthermore no initiation of any multiplying operations, which multiplying operations are normally initiated by the reset of the LH accumulator. With a misplaced detail card reset of the LH accumulator is prevented. With misplaced detail cards in a run of cards card feed cycles continue to reject the misplaced detail cards to the reject box and no extra cycles are introduced for multiplying operations either dummy or otherwise.

Referring to Fig. 2, assume that a misplaced detail card is about to be sensed by the brushes 84 and that the operations on the preceding correct detail card are being performed. Upon the passage of the misplaced detail card past the brushes 84 the control number is read from the detail card. Such control number then fails to compare with the control number previously set up in the CN receiving device. While the control comparison is being made a multiplicand amount is being entered into the MC receiving device. This multiplicand, however, is an unwanted multiplicand because it pertains to a misplaced card. The machine therefore automatically resets or zeroizes the multiplicand counter when there is a failure of comparison or control.

Referring to Fig. 12a, if the control number fails to compare, relay coil J does not become energized at the usual time for such energization. Relay coil J, if comparison did occur, would be energized before the leading edge of the comparing card reached the deflector 128 (Fig. 2). Accordingly, with J not becoming energized (see Fig. 12b) at the time cam contacts FC—15 close and with relay contacts H—3 and J—4 closed, the deflector magnet 129 would become energized in time to shift the deflector vane 128 (Fig. 2) upwardly into the path of the advancing misplaced card and cause it to be deflected to the reject box 127. The passage of the incorrect or misplaced detail card past the sensing brushes will have entered the new multiplicand amount therefrom into the MC receiving device. It must therefore be immediately reset. This is effected in the following manner. Referring to Fig. 12b with relay coil J deenergized, contacts J—6 remain closed. Accordingly, when cam contacts FC—17 close current will flow from the 222 side of the AC line, through relay contacts C—5 now closed, through cam contacts FC—17, relay contacts J—6 and H—5, through switch 211 in the position shown, through relay contacts F—2 in the position shown, via switch 215 in the position shown, to the wire leading to the 254MC reset magnet and back to ground. With 254MC energized, reset of the MC receiving device will be effected. With relay coils J and H both deenergized, relay contacts H—7 and J—2 (Fig. 12b) will both be open so that no current will flow to the 232SR magnet pertaining to the serial number counter. Accordingly, there is no counting of the misplaced detail card.

Serial number imprinting operations will be suppressed thus preventing the turning up of a serial number in the serial numbering stamp head inasmuch as relay contacts J—3 are open at the time cam contacts FC—4 close (Fig. 12b) so that there will be no energization of the serial number stamping solenoid 122. Reset of the LH accumulator is suppressed since relay contacts J—5 and H—4 are open (Fig. 12b) at the time cam contacts FC—16 close.

Provision should be made now to initiate a further card feed cycle to bring along the following card. This is effected in the following manner.

Referring to Fig. 2, when a misplaced detail card is delivered to the reject box 127 the preceding correct detail card will be in the punching die and will ultimately feed out of the punching die, leaving no card in the punching die so that the card lever contacts 87 in the punch open up and remain open. With these card lever contacts opened up, relay coil D (Fig. 12b) becomes deenergized and remains de-energized. Accordingly, relay contacts D—1 remain closed and with these contacts closed upon closure of the FC—1 cam contacts at the end of the card feed cycle in which the misplaced card is rejected to the reject box there will be a re-energization of the card feed clutch magnet 70. It will be remembered that the D—1 contacts would normally open up at this time if relay coil D were energized by the presence of a card in the punching die. Energization of D would normally occur before cam contacts FC—1 close. A new card feed is thereupon re-initiated and if the following card is also a misplaced detail card there will be a reject of this card followed by a new card feed and so on.

It may be mentioned here that with misplaced detail cards there is no reset of the CN receiving device since no current is allowed to flow to the 254CN reset magnet. Similarly there is no reset of the MP receiving device.

*Detail card or cards misplaced followed by leading multiplying card*

When the machine operates under the condition with cards in the run where a misplaced detail card is followed by a new leading multiplier card the operations must be modified. With the machine operating under these conditions the sensing of the new leading card by the machine will signify that a new leading card is coming along and that the multiplier and control number therefrom are to be entered into the multiplier and control number counters. Under these conditions at the time the MC receiving device is being reset to eliminate from the MC receiving device the erroneous multiplicand, there is a concurrent reset of the MP and CN receiving devices. The sensing of the new leading card with the multiplier amount thereon will have caused energization of relay coil E and energized relay coil F. With F energized (Fig. 12b) relay contacts F—2 will be shifted to reverse position and contacts F—3 will also be shifted to reverse position. Accordingly, when the reset impulse flows through relay contacts C—5 and contacts FC—17, J—6, H—5, such impulse will flow through the shifted F—2 contacts through switch 216, now in the position shown, via the jumper, via wire 271, through switch 209 in the position shown, to the 254CN reset magnet and also directly to the 254MP reset magnet and through relay contacts F—3 now closed, switch 214 in the position shown to the 254MC reset magnet. Under these conditions there is a concurrent reset of the MC, MP and CN receiving devices. Following this resetting operation the new control number and new multiplier are taken in from the new leading card in the manner previously explained.

If in a run of cards, a leading card is followed directly by a misplaced detail card, the detail card will be rejected in the manner previously explained.

There is a further condition which the machine must take into account, that is a starting up operation with a leading multiplying card entering first, which is followed directly by a misplaced detail card or cards. The operations of the machine under this condition are the same as if there was a normal run of cards with a leading master card which was followed somewhere in the run by a misplaced detail card.

If misplaced detail cards preceded the leading card on starting up on a run of cards, these misplaced detail cards will be automatically rejected. The reason for this will be obvious without detailed description. On starting up there will be no control number in the control number receiving device and accordingly, if the first entering cards are misplaced detail cards there will be no number in the control number receiving device for the control number sensed from the misplaced detail cards to compare with. Under this condition there will be a reject of the detail cards to the reject box. Upon the leading multiplier card coming along the sensing of the multiplier will cause the entry of this multiplier amount and the control number amount into the respective receiving devices and the operation will then proceed as before.

There is another condition taken care of by the machine which is a condition upon starting up on a card run where the first leading multiplier card is directly followed by another multiplier card. Operating under this condition the sensing of the second card or a further directly following multiplier card will cause a reset of the CN and MP receiving devices so that the new multiplier and control number amount will be read into these receiving devices on the following card feed cycle from the next following card. The same action occurs if two leading cards both with multiplier amounts follow one right after the other in a regular card run.

Stopping on running out of cards

The stopping operations on running out of cards involve three possible conditions. First, the last card may be a regular detail card; second, the last card may be a master card or multiplier card; and third, the last card may be a misplaced detail card. If the last card is a regular detail card, ultimately card lever contacts 85 and 86 will open and this will bring about a de-energization of relay coils B and C (Fig. 12b) with attendant opening of relay contacts B—1 and C—1 to break the stick circuit for relay coil A. With relay coil A de-energized upon the punching operation upon the last detail card the closure of cam contacts PC—2 will not complete a circuit to the card feed clutch magnet 70, inasmuch as relay contacts A—2 are open. This will stop further clutching of the card feed clutch. Under these conditions, special provisions must be made for getting the last detail card out of the punching section of the machine and provision should also be made for resetting the multiplicand receiving device, the multiplier receiving device and the control number receiving device. For this purpose an auxiliary start key 272 (Fig. 12b) is provided having three sets of contacts 272a, 272b and 272c. By depressing the auxiliary start key all of the sets of contacts become closed. Upon closure of cam contacts CC—1 a circuit is established directly to the card feed clutch magnet 70 to initiate a card feed to carry the last detail card out of the punch. The closure of contacts 272b and 272c will, upon closure of cam contacts CC—2, which close at the same time as cam contacts CC—1, bring about an energization of the 254CN reset magnet, the 254MP reset magnet and the 254MC reset magnet to reset the corresponding three receiving devices. With cards running out in this manner it may be desirable to reset the serial number counter. This may be effected by depressing a special reset key (Fig. 12b) and causing closure of reset contacts 273 so that on closure of cam contacts CC—3 the 254SR reset magnet would be energized. The last card operations whether the last card is a master or multiplier card, are the same as just described for operations where the last card is a regular detail card.

Upon machine operations where the last card is a misplaced detail card the control is somewhat different. Under this condition the last card, due to the failure of comparison, will be rejected to the reject box by the energization of magnet 129 (Fig. 2) and no special re-initiation of card feed is required to get the misplaced last detail card to the reject box. The MC, MP and CN receiving devices, however, must be reset by a manually initiated operation effected in the manner previously described. An idle card feed cycle occurs but this is of no consequence.

Operating condition number two

Under operating condition number two, the leading card which may be termed for convenience "the master card", contains a control number, a multiplicand amount and a multiplier amount. The detail cards which follow the master leading card contain control numbers and multiplicand amounts only. It will be recalled that under condition number one the leading or master card contains no MC amount.

The essential difference of operation of condition number two over condition number one, is that computing operations must be performed on the first or master card as well as upon the following correctly placed detail cards. Punching must also occur on the first card and serial number counting and imprinting and punching operations should be performed on such first card instead of being suppressed as in condition number one. For the machine to operate under condition number two the plugging is the same as for condition number one. The position of various switches, however, is different, viz. switches 206 and 207 (Fig. 12b) and 208 (Fig. 12a) are thrown to open position as shown. On Fig. 12a switch 201 is closed. On Fig. 12b switch 202 is closed to the left, switch 203 is thrown down, switch 204 is thrown to closed position, switch 205 is kept closed in the position shown as are switches 209, 210 and 211; switch 212 is in the right hand closed position as shown. Switch 213 is in the position shown, i. e. closed to the left. Switch 214 is in down closed position as shown. Switch 215 is in the upper closed position as shown, 216 is in the upper closed position as shown and 217 is closed as shown.

It may be explained that with switch 201 (Fig. 12a) thrown to closed position that on the entry of the multiplier amount from the leading master card there will also be an entry of the multiplicand amount from this card. In other words, the effect of closing switch 201 is to cut out the suppression of multiplicant entry from the first card which is normally effected by the shifting of contacts G—2. The effect of shifting switch 202 to left closed position is to effect serial number imprinting on the leading master card since during operation upon the leading master card, relay coil H is energized and relay contacts H—6 are closed. Imprinting of serial numbers on detail cards it will be recalled is effected through the control of relay contacts J—3. The effect of throwing switch 203 to closed down position is to effect a serial number entry into the serial number counter for the leading master card as well as for the following detail cards. The effect of closing switch 204 is to permit the establishment of the circuits to the punch electro magnets for all cards including the leading master card in place of cutting out this circuit for the first card as heretofore.

The purpose of switch 205 is to provide means for permitting of the suppressing serial number printing and this may be done on any operating condition from one to seven inclusive.

Switches 206 to 216 inclusive, for operating condition number two are in the same relation as for operating condition number one and their function therefore need not be repeated here.

Switch 217 is provided to cut out serial number entries when it is thrown to open position or to permit such entries when thrown to closed position. This switch may be manipulated for all operating conditions from one to seven inclusive and need not be further referred to.

With the machine operating under condition number two, the controls which are effected with (a) a normal card run no cards misplaced; (b) a normal card run with a single or number of detail cards misplaced; (c) a normal card run with detail cards misplaced followed by a master card; (d) a normal card run with a master card followed directly by a misplaced detail card or cards; (e) a starting up condition with the master card first followed by a misplaced detail card or cards; (f) a starting up operation with misplaced detail cards preceding the master card; (g) a starting up operation with two master cards together; (h) a normal card run with two master cards together; (i) a machine operation with a last card which is a regular detail card; (j) a machine operation with a last card which is a master card; (k) a machine operation with a last card which is a misplaced detail card; are all provided for and are effected in practically the same manner as more fully described for operating under condition number one.

*Summarizing.*—The difference of operation of condition one and condition two is that under condition two the multiplicand is read from the first card instead of not being read from the first card and that serial number printing, serial number counting and punching are effected for the first card as well as for the following correctly placed detail cards. As in condition number one, improperly placed detail cards are rejected from the machine automatically.

*Operating condition number three*

In operating under operating condition number three, the first card of a run contains a multiplier amount only but no control number or multiplicand amount. The detail cards which follow the leading master card contain multiplicand amounts only but no multiplier amount or control number amount. For operating under this condition the switches are placed as follows. Switches 201 and 208 (Fig. 12a) are placed in open position. On Fig. 12b switch 202 is closed to the right, 203 is closed up, 204 is open, 206 and 207 are open, 209 is closed, 210 and 211 are open, 212 is closed to the left, 213 is closed to the left, 214 is closed down, 215 and 216 are closed up and 217 is closed.

In operating under operating condition number three, no control number whatsoever is read from the card. Accordingly, there is no rejection of detail cards on account of possible misplacement. All detail cards are serially imprinted, serially counted and product punching is effected on all detail cards. Punching is suppressed on the leading master cards and these cards are not counted, nor serial number printed or punched thereon.

In plugging up the machine for operating condition number three the plugging is for the same as for operating condition number one except that no plug connections are made to the sockets at plug board 234 (Fig. 12a) which connect to the G3—10 contacts and accordingly no control number is entered into the control number counter, nor is any comparison operation made under this type of run.

Referring to the switches, by placing switch 201 (Fig. 12a) in open position as shown, the operations will be the same as for operating condition number one, that is, there will be no multiplicand reading from the leading or master card, but the multiplicand will be read from the following detail cards under control of relay contacts G—2 in nonshifted position.

By throwing switch 202 (Fig. 12b) to the closed right position, provision is made for serial number imprinting on all detail cards. Relay contacts D—2 will be closed at the time contacts FC—14 close and serial number imprinting will be effected for all detail cards. As previously described the relay contacts H—8 under control of relay coil H, have the effect of suppressing serial number imprinting on the leading or master card. Referring to switch 203 (Fig. 12b) by placing this switch in upper closed position entries into the serial number counter are permitted for each detail card by reason of the closure of relay contacts D—3 but are suppressed for leading master cards by reason of the opening of relay contacts H—9.

With switch 204 thrown to open position, punching operations will be suppressed for the leading master card.

Switches 205 and 217 have their previously described function.

Under operating condition three, switches 206, 207, 208 and 209 have the same status as in operating condition number one and no further description is here required.

Switch 210 is thrown to open position to completely cut out the circuit to the deflector vane magnet 129 and to prevent the deflection of any cards to the reject box.

Switch 211 is thrown to open position to break the supplemental reset circuit for the MC accumulator which reset is used on operations where there is card comparing. On the type three form of operation no card comparing is being effected and accordingly the supplemental circuit through cam contacts FC—17, J—6 and H—5, etc. is entirely interrupted by opening switch 211. Operating under these conditions the reset circuit for the MC accumulator is through the circuit path including relay contacts C—5, cam contacts PC—3 and relay contacts G—11.

The purpose of switch 212, which is thrown to left hand closed position, is to provide a reset circuit for the LH accumulator through relay contacts C—4 and cam contacts FC—19 so that the LH accumulator becomes reset for each and every card which is handled by the machine. By resetting the LH accumulator, the cycle controller is set up for initiating the regular multiplying operations or dummy multiplying cycles are initiated for the leading master card. It will be recalled that under operating condition number one the reset of the LH accumulator was controlled by relay contacts J—5 or relay contacts H—4 and such control circuit is entirely cut out by shifting switch 212 to left hand position.

Switches 213 to 216 inclusive have the same status as in operating condition number one and require no further description.

In operating under operating condition number three the machine is arranged as in condition number one to handle (a) a normal run of cards; (f) a starting up condition with one or more detail cards preceding a following master card; (g) a starting up condition with two or more master cards together; (h) a normal run of cards with two or more master cards following in direct succession in the card run; (i) a last card condition in which the last card is a detail card; (j) a last card condition in which the last card is a master card.

*Operating condition number four*

In operating under operating condition number four the first and leading card is a card which contains a multiplier amount only and this multiplier amount serves as a control number. The following detail cards each contain a multiplicand amount and a multiplier amount, but such multiplier amount in each detail card serves as a control number for such detail card, this control number being compared with the multiplier amount read into the machine from the leading card and which stands in the control number receiving device. The machine operating under this condition in place of sensing for the presence of a multiplier amount on a card senses for the presence of a multiplicand amount and if a multiplicand amount is upon a card the machine is apprised that the card is a detail card and effects operations accordingly. If a card is sensed which contains no multiplicand punchings the machine is otherwise controlled. Operating under this condition the machine is adapted to effect suppression of punching, serial number imprinting and serial number punching on the leading multiplier card but to effect such operations and serial number counting for the detail cards. As in condition number one if the control number amount, which in condition number four is the multiplier amount, does not compare, the erroneous and misplaced detail card will be rejected from the machine automatically. As in condition number one, if a misplaced detail card is rejected there is no serial number entry, imprinting or punching.

*Plugging*

For operating condition number four, plugging is effected in the following manner. In plugging up the machine for this type of operation the sockets 226 (see Fig. 12a) which pertain to the multiplicand field of the card are plugged to the sockets 227 and as in condition number one there is a plugging from a socket 228 to a socket 229.

In the present case the multiplier amount is also used as a control number. Accordingly, plugging is made from sockets 230 pertaining to the multiplier field to the sockets 234 and from the double plug sockets of plug board 235, one set of plug connections are made to the sockets wired to the 232CN counter magnets and another set of plug connections are made to the sockets 231 which are wired to the 232MP magnets. For entry of the multiplicand amounts in the machine plug connections are made from sockets 233 to the sockets 230 which pertain to the multiplicand field of the card.

*Switch positions for operating condition number four*

Switch 201 (Fig. 12a) is thrown to open position and on Fig. 12b, switches 202 and 203 are thrown to intermediate open position, 204 to open position, 205 to closed position, 206 and 207 to open position, 208 (Fig. 12a) to open position and on Fig. 12b, 209, 210, 211 to closed position, 212 and 213 to closed right position, 214 to closed up position, 215 and 216 to closed down position and 217 to closed position.

Operating under condition number four, the status of switches 201 to 212 inclusive is the same as in condition nmber one and their controls need not be here repeated.

Referring, however, to switch 213 (Fig. 12b) this switch in place of being in closed left position as in operating condition number one, is in closed right position. It will be recalled that in operating condition number one the leading card was sensed to determine the presence of a multiplier therein. Under operating condition number four the condition is just the reverse, that is the first card is sensed not to determine the presense of a multiplier therein but to determine the absence of a multiplicand amount on such card. It is the absence of the multiplicand amount on the first leading card which controls the machine operations on such card. With an absence of a multiplicand amount on the entering first card, relay coil E (Fig. 12a) is not energized. Accordingly, relay contacts E—1 do not close and relay coil F is not energized for such card which contains no multiplicand. Accordingly, with switch 213 in closed right position relay contacts F—4 will remain closed with F de-energized, and upon closure of cam contacts FC—6 and with relay contacts C—6 closed, which is their status with a card under the card lever 86, a circuit is established to energize relay coil G from the 220 side of the DC line, through relay contacts C—6 now closed, contacts F—4, cam contacts FC—6, through relay coil G to the other side of the line. The energization of relay coil G subsequently brings about an energization of relay coil H. The energization of relay coils G and H control machine operations upon the leading card as in condition number one, that is, they direct the entry of the multiplier amount from the first card into the control receiving device and also into the MP receiving device by relay contacts G3—10. Energization of G shifts relay contacts G—2 to provide a return circuit to ground from the 232MP magnets and the energization of relay coils G and H under these conditions perform exactly the functions performed under operating conditions number one. Upon the passage of the first detail card through the machine, the multiplicand amount will be sensed and relay coil E (Fig. 12a) will become energized. With E energized, relay contacts E—1 (Fig. 12b) become closed and F becomes energized. The energization of relay coil F opens contacts F—4 so that the previously described pick-up circuit for relay coil G is broken so that relay coils G and H never become energized on the sensing of detail cards.

Referring now to switches 214, 215 and 216, these switches are placed as shown in the circuit diagram for condition one so that they can operate in conjunction with relay contacts F—2 and F—3 to control the reset of the multiplicand counter alone when a misplaced detail card is followed by another detail card and to also control the concurrent reset of the MC, MP and CN receiving devices when a master card follows a misplaced detail card. When the machine is operating under condition four, relay coil F is energized in a different manner, that is, as the result of sensing the MC amount on a detail card. Accordingly, the relation of switches 214, 215 and 216 must be changed to provide for the reset of MC alone or the concurrent reset of MC, MP and CN. By placing switch 214 in upper closed position, contacts F—3 are cut out of the controlling circuit and contacts F—5 are placed in a control circuit which extends through contacts D—4. Switch 215 upon being thrown to lower closed position, places the circuit to line 271 in circuit with the left hand contact of the F—2 group. Switch 216 on being shifted to lower closed position places the right hand F—2 contact in circuit with a wire 274 which extends over to the line leading to the 254MC reset magnet. With the switches 214, 215 and 216 placed in this reverse position, if a misplaced detail card is followed by another detail card, relay coil F will be energized shifting relay contacts F—2 to reverse position and opening contacts F—5. Accordingly, when a failure of comparison occurs relay contacts J—6 will not be open and the resetting current will flow down past relay contacts C—5, through cam contacts FC—17, relay contacts J—6 and H—5 now closed, through switch 211, relay contacts F—2 in shifted position, through switch 216 in shifted position, back to line 274 and to the reset magnet 254MC. Current under these conditions cannot flow to reset magnets 254MP and 254CN because contacts F—5 are open. This control will provide for resetting of the MC receiving device alone when a misplaced detail card is followed by another detail card. If on the other hand a misplaced detail card is followed by a master card, relay coil F will not become energized, no multiplicand amount being sensed from the master card. Accordingly, relay contacts F—2 will not be shifted and relay contacts F—5 remain closed. The reset circuit under these conditions is through relay contacts F—2, through switch 215, through the closed relay contacts F—5 and D—4, via switch 214 in upper closed position to the 254MC reset magnet. Current also flows directly to the 254MP reset magnet and over through switch 209 which is in the position shown to the 254CN reset magnet.

The purpose of the just described controls will be apparent if it is considered that the operation of the F relay is reversed with respect to the operation of this relay under operating condition number one, that is on operating condition number one, F becomes energized on the first or leading card because an MP amount is sensed, whereas under operating condition number four F does not become energized on the first leading card because no MC amount is sensed. Relay F does become energized for detail cards on the type four operation.

When the machine is operating under a type four operating condition, the controls provide for the following operations which in character are identical with similar operations on a type one run of cards. (a) A normal run of cards with no cards misplaced; (b) a normal run with a single or a number of detail cards misplaced; (c) a normal run of cards with a detail card or cards misplaced followed by a master card; (d) a normal run of cards with a master card followed directly by a misplaced detail card; (e) a starting up condition with a master card leading followed by a misplaced detail card or cards; (f) a starting up condition with misplaced detail cards preceding the master card in the beginning of the run; (g) a starting up condition with two or more master cards following one after the other; (h) a normal run with two or more master cards coming together; (i) the last card operation in which the last card is a regular detail card; (j) a last card operation in which the last card is a master card; (k) a last card operation in which the last card is a misplaced detail card.

*Operating condition number five*

With operating condition number five on this type of run the arrangement of the cards is the same as in the preceding run, that is the first or leading card which is the master card is a card containing an MP amount only which MP amount serves as a control number. The following cards of the run each contain multiplicand amounts and a multiplier amount, the multiplier amount serving as a control number. Each of the master cards are also provided with an extra punching in either the 11th or 12th index point position on such master card. It is the presence of the extra hole in the master card which determines that the card is a master card and provision is made on this type of run for sensing this extra hole on such master cards and controlling machine operations in accordance with the absence or presence of such extra hole. In this respect a type five run is substantially identical in its operations with a type one run, except that in place of sensing a multiplier field to determine whether or not the card contains a multiplier or lacks such multiplier a single index point position on the card is sensed. On this type of run serial number printing, serial number punching, product punching and serial number counting operations are suppressed for the master cards just as in the type one operation. Likewise detail cards in which the multiplier amount does not compare with the multiplier amount appearing on the leading master card are automatically rejected.

Under operating condition five, the plugging from the plug sockets associated with the second set of sensing brushes 84 is just the same as the plugging for condition four explained above. The plugging from the advance set of brushes 83 is, however, different. A single brush of the 83 set in the column in which the extra index perforation appears is connected to one of the plug sockets 227. A plug connection is also made from one of the sockets 228 to either socket 275 or 276 depending upon whether the extra hole is either in the 11th index point position and the 12th index point position respectively and upon closure of one of the contacts FC—3 or FC—4 and upon the concurrent sensing of the extra index point hole on the master card, relay coil E becomes energized. Thereafter the control and following operations are just as in the type one operation above fully described.

It may be noted that for condition five, switches 201 to 217 inclusive are set in the identical manner as for operating condition number one.

*Operating condition number six*

This is a special type of operation which finds utility in some calculating operations, particularly on long card runs. On this type of operation the primary control is from the control number on the first card. The first card contains a control number amount, a multiplier amount and a multiplicand amount and all following detail cards contain multiplier and multiplicand amounts and also a control number. If the control number changes on any detail card which follows the leading card the card or cards with variant control numbers will be rejected. With this type of run computations are performed on each and every card except rejected cards and serial number printing and punching operations are performed on each and every card as well as product punching operations on each and every card, with the exception of course, of rejected cards which are rejected prior to reaching the serial numbering and punching station.

The plugging for a type six operation is exactly the same as for a type one operation.

The switches are positioned as follows. Switch 201 (Fig. 12a) is in open position and switch 208 (Fig. 12a) is in closed position. Switch 202 is in left hand closed position, switch 203 is in downward closed position. Switches 204, 205, 206 and 207 are in closed position. Switch 209 is in open position, switches 210, 211 are in closed position, switch 212 is closed to the right and 213 is closed to the left. Switch 214 is closed in down position, switches 215 and 216 are in closed upper position and 217 is in closed position.

It will be appreciated that on this type of operation the control number receiving device is never reset automatically by the operation of the machine, resetting only being effected by the closure of the supplemental start key contacts 272b. Accordingly, switch 209 is thrown to open position which cuts out all automatic resetting operations for the CN receiving device. On this type of run switch 201 is entirely ineffective because switch 208 is thrown to closed position so that on each card there will be a return circuit completed from both the 232MP and 232MC magnets to ground, irrespective of the status of the relay contacts G—2. Switch 202 is shifted to the left hand position for the same reasons that it was shifted in running condition two, that is to permit serial number imprinting on all cards including the first leading card. With switch 202 in left hand closed position serial numbering will only be suppressed for misplaced cards under control of contacts J—3 and H—6. Switch 203 is thrown to downward closed position for the same reason given for condition two, that is, to permit serial number entry for all cards except misplaced cards. Switch 204 is closed so that punching will occur on all cards including first card. Switch 205 has its usual function. It may be left closed or open depending upon whether or not serial number imprinting is wanted or not. Switch 206 is a switch in a circuit not previously described in any of the previous types of runs. This switch 206 (Fig. 12b) is placed in a circuit extending from the 220 side of the DC line through relay contacts G—13 to an L relay coil. On this type of run it is desired that the first leading card be sensed in order that the control number be entered into the machine. Thereafter, however, advance sensing of succeeding cards is unnecessary and such advance sensing is eliminated under the control of relay coil L. On the passage of the first card past the advance brushes 83 E is energized as on the type one run. Energization of E in turn brings about the energization of F, then G and then H. Energization of G in addition to its functions previously described effects the closure of relay contacts G—13 (Fig. 12b) so that with switch 206 closed, relay coil L becomes energized. L is maintained energized by stick contacts L—1 which have their circuit completed back to the other side of the line, through cam contacts FC—18 and relay contacts C—3. On running operations of the machine relay contacts C—3 are closed when cam contacts FC—18 open. With relay coil L energized, relay contacts L—2 (Fig. 12a) open up after the first card is sensed to interrupt the advance sensing circuit through relay coil E after the first card has been sensed. The advance sensing circuit is therefore interrupted throughout machine operations on all succeeding cards following the first card of a run. On this type of run it will be understood that the MP receiving device is to be reset each time the MC receiving device is reset. This is effected by closing switch 207 which establishes a direct reset circuit to the 254MP reset magnet. There is no reset of the CN counter on account of the opening of switch 209 as previously described. Switches 210 to 217 inclusive are in the same position for a type six run as in operating condition number one and require no further description.

Operating under type six kind of run the machine is adapted to perform as with the type one run (a) normal runs with no cards misplaced; (b) normal runs with the single or number of detail cards misplaced; (i) last card operation in which the last card is a regular detail card; (k) a last card operation in which the last card is a misplaced detail card.

*Operating condition number seven*

It may be desirable under certain conditions to operate the machine without the control features and without the rejection of cards into the reject box. Operating under this condition each card would have perforated thereon the amount of the multiplicand and the amount of the multiplier. When the machine is to be operated as a simple record controlled and record making multiplying machine without the control and reject features no plugging would be provided to the advance brushes 83 and to sockets 226. Simple multiplier and multiplicand plug connections would be made intermediate sockets 230 and 231 and 233 and no plug connections whatsoever would be made at plug board 234. Operating under these conditions the switches would be disposed as follows; switch 201 (Fig. 12a) would be in open position and switch 208 on this figure would be in closed position, thus providing a return circuit to ground from the multiplicand and multiplier receiving devices. On Fig. 12b, switch 202 is thrown to its closed right position if serial number printing is desired on every card and if serial number printing is to be suppressed, switch 205 would be thrown to open position, otherwise it would be in closed position. Switch 203 would be thrown to closed upper position for serial number counting in the counter and to intermediate position if serial number counting is not desired. Switch 204 may be thrown to closed position if desired. Switch 206 is thrown to open position to interrupt the circuit to relay coil L. Switch 207 is thrown to closed position to provide concurrent reset of the multiplier receiving device with the multiplicand receiving device. Switch 209 is thrown to open position to cut off the reset circuit to the control number receiving device, which receiving device is not used on this type of operation. Switch 210 is thrown to open position to interrupt the circuit to the deflector vane solenoid. Switch 211 is thrown to open position to interrupt the shunt reset circuit and prevent unwanted resetting operations. Switch 212 is thrown to left hand closed position to provide for LH reset on each computing operation for each card. Switch 213 may be in any position because its related circuits are completely ineffective. If desired it can be thrown to an intermediate open position or closed left or closed right. Switches 214, 215 and 216 may be in any position as their control in this case is ineffective. Switch 217 can be placed in closed position as shown when serial number entry is desired and thrown to open position when serial number entries are unwanted.

Summarizing, the serial numbering controls of the present invention include the relays J and H which are variably controlled by the reading means from the records to detect records having various distinctive characteristics and to thereby variably control the serial numbering means which comprises the serial number punching means, the serial number printing or stamp head actuating means and the number counting means. Under operation #1, energization of H, upon detection of a leading record, opens contacts H—2 (Fig. 12b) to prevent serial number punching on the leading card of a group. A like suppression of punching is effected for misplaced detail cards by the rejection of the misplaced detail card before it reaches the punch. Also punching is permitted for following detail cards since contacts H—2 remain closed for such cards. Relay J, when de-energized for a leading card condition, leaves contacts J—2 and J—3 open, whereby no serial number counting or printing is effected for such cards. For misplaced detail cards, H—7 and J—2 are open to suppress serial number counting and open contacts J—3 suppress serial number printing. On detail cards J—2 and J—3 are closed to permit counting and printing.

On operation #2, closure of H—6 with switch 202 closed to the left permits serial number stamping or printing on the first card of a group. With 203 closed down, serial number counting will be effected on both leading and following detail cards. On closure of J—2 with switch 204 closed, serial number punching is permitted on all leading and detail cards since contacts H—2 are now ineffective.

On operation #3, all detail cards will be serially imprinted, counted and punched, but with this type of operation punching is suppressed on leading cards by contacts H—2. 202 is closed to the right and the circuit through D—2 with H—8 closed will provide for serial number printing on detail cards, while with H—8 open, printing will be prevented on master or leading cards. With switch 203 closed up, it will allow serial number printing for detail cards, through D—3. H—9 open will suppress counting for leading cards and with 204 open punching will be suppressed on leading cards.

Operations Nos. 4, 5, 6 and 7 need not be traced in detail.

What we claim is:

1. A record controlled machine with record handling means for automatically passing a series of records in a common run in automatic succession through the machine, said records in said run including one or more records of one form with the same distinguishing characteristics upon which serial numbering operations are to be suppressed and one or more records of another form with the same distinguishing characteristics but which are different from those of the first mentioned form and upon which records serial numbering operations are to be effected, means including record reading means controlled solely by the records in the common run and controlling detecting means controlled by said reading means for distinguishing one form of record from another, means for effecting serial numbering operations, means controlled by the aforesaid detecting means for controlling the serial numbering effecting means to suppress serial numbering on one or more records of one form having the same distinguishing characteristics, and means controlled by said detecting means for controlling the serial numbering effecting means to effect serial numbering on one or more records of another form having the same distinguishing characteristics but which are different from the characteristics of the records on which serial numbering is suppressed.

2. The invention according to claim 1, wherein the record reading means and detecting means includes supplemental means to read and detect records of one form which are misplaced in a run with means controlled by said supplemental means to suppress the operation of the means for effecting serial numbering operations for such misplaced records.

3. The invention according to claim 1, wherein the supplemental record reading means and supplemental detecting means controlled thereby are provided for reading and detecting leading records of a group in the common run, said supplemental detecting means upon detecting a leading record controlling the operations of the serial numbering means to suppress serial numbering operations for records which are read and detected as leading records.

4. The invention according to claim 1 wherein the serial numbering means includes serial number imprinting means.

5. The invention according to claim 1 wherein the serial numbering means includes serial number counting means which is effective to count when serial numbering is effective under the control of the detecting means and ineffective when the detecting means calls a different control into operation when other distinctive records are read and punching means controlled by said counting means for punching serial numbers on records with one characteristic.

6. The invention according to claim 1 wherein the serial numbering means comprises serial number punching means controlled by the detecting means for punching serial numbers upon records with one characteristic and suppressing punching on records with a different characteristic.

7. A record controlled accounting machine with record handling devices to pass a series of records in succession in a common run through the machine, certain records in a common run being master records and other records being detail records, said master and detail records having distinguishing characteristics thereon to designate the type of record, means for sensing the distinctive characteristics upon the records to determine solely by the sensing of the records in the common run whether a record is a detail or master record, means for effecting serial numbering operations on the record, said means including devices under the control of the aforesaid sensing means for suppressing serial numbering operations upon the master records while permitting such operations upon the detail records.

8. The invention set forth in claim 7 in which the serial numbering means comprises serial number imprinting means.

9. A record controlled accounting machine with record handling devices to pass a series of records in a common run through the machines, certain records being master records and other records being detail records, means for sensing the record for a distinguishing characteristic to determine whether each record is a master record, means for effecting serial numbering operations upon some of the records, said means including devices solely under the control of the aforesaid sensing means which sense the records in the common run for suppressing serial numbering operations upon the master records while permitting such operations upon the detail records, the aforesaid means for effecting serial numbering means comprising serial number punching means and control means therefor.

10. The invention set forth in claim 9 in which the records passing through the machine include improper misplaced detail records and a supplemental control means is provided for controlling the serial numbering means suppressing serial numbering operations upon sensed improper and misplaced detail records, said supplemental control including means controlled by the improper and misplaced detail cards.

11. The invention set forth in claim 9 in which the serial numbering means comprises a counter with means for controlling it whereby it counts passing sensed detail records and whereby it omits the counting of sensed master records and sensed misplaced detail records and punching means controlled by said counting means for punching serial numbers in detail records.

12. The invention set forth in claim 9 in which selective manual operable means is provided with a control therefrom for rendering ineffective the serial number suppressing devices to permit serial numbering operations upon the master records upon which serialling would otherwise be automatically suppressed.

GEORGE F. DALY.
ARTHUR H. DICKINSON.